United States Patent
Misra et al.

(10) Patent No.: US 10,409,914 B2
(45) Date of Patent: Sep. 10, 2019

(54) CONTINUOUS LEARNING BASED SEMANTIC MATCHING FOR TEXTUAL SAMPLES

(71) Applicant: Accenture Global Solutions Limited, Dublin (IE)

(72) Inventors: Janardan Misra, Bangalore (IN); Shubhashis Sengupta, Bangalore (IN); Milind Savagaonkar, Bangalore (IN); Sanjay Podder, Thane (IN); Srinivas Keshava Murthy, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 21 days.

(21) Appl. No.: 15/670,886

(22) Filed: Aug. 7, 2017

(65) Prior Publication Data
US 2018/0060307 A1    Mar. 1, 2018

(30) Foreign Application Priority Data
Aug. 31, 2016 (IN) .............................. 201641029668

(51) Int. Cl.
*G06F 17/27* (2006.01)
*G06N 20/00* (2019.01)
(Continued)

(52) U.S. Cl.
CPC ........... *G06F 17/2785* (2013.01); *G06N 3/08* (2013.01); *G06N 20/00* (2019.01); *G06Q 10/063112* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS

| | | | | |
|---|---|---|---|---|
| 5,483,637 A | * | 1/1996 | Winokur | H04L 43/00 714/26 |
| 6,550,024 B1 | * | 4/2003 | Pagurek | G06F 11/0709 714/47.2 |

(Continued)

OTHER PUBLICATIONS

Alvas, "Semantic Relatedness Algorithms—python", https://stackoverflow.com/questions/21374375/semantic-relatedness-algorithms-python/21377351#21377351, Jan. 27, 2014, 3 pages.

*Primary Examiner* — Lamont M Spooner
(74) *Attorney, Agent, or Firm* — Harrity & Harrity, LLP

(57) ABSTRACT

A method may include receiving, by a device, an input sample of textual content. The method may include identifying, by the device, a comparison sample that is semantically similar to the input sample. The comparison sample may be identified based on a similarity score, of the comparison sample and the input sample, satisfying a semantic similarity threshold. The method may include identifying, by the device, a plurality of output samples of textual content based on acceptance information corresponding to the plurality of output samples and the comparison sample. The acceptance information may be determined based on a user input regarding similarity or relevance of the plurality of output samples and the comparison sample, and the user input may be received before the input sample is received.

20 Claims, 12 Drawing Sheets

(51) Int. Cl.
*G06Q 10/06* (2012.01)
*G06N 3/08* (2006.01)

(58) Field of Classification Search
CPC .. G06F 17/272; G06F 17/2725; G06F 17/273;
G06F 17/2735; G06F 17/274; G06F 17/2745; G06F 17/275; G06F 17/2755;
G06F 17/276; G06F 17/2765; G06F 17/2795
USPC .................................................. 704/1, 9, 10
See application file for complete search history.

(56) References Cited

U.S. PATENT DOCUMENTS

| | | | | |
|---|---|---|---|---|
| 8,037,009 | B2* | 10/2011 | Hibbets | G06Q 10/10 |
| | | | | 706/45 |
| 8,935,153 | B2 | 1/2015 | McKeeman et al. | |
| 9,317,829 | B2* | 4/2016 | Anand | G06Q 10/0635 |
| 9,779,174 | B2* | 10/2017 | Sheik Adam | H04L 63/0407 |
| 2007/0055610 | A1* | 3/2007 | Palestrant | G06Q 10/06 |
| | | | | 705/37 |
| 2008/0010531 | A1* | 1/2008 | Hendler | G05B 23/0281 |
| | | | | 714/33 |
| 2008/0228684 | A1* | 9/2008 | Tamaki | G06N 5/02 |
| | | | | 706/45 |
| 2011/0066908 | A1* | 3/2011 | Bartz | G06F 11/0709 |
| | | | | 714/746 |
| 2011/0218945 | A1* | 9/2011 | Betzler | G06F 15/18 |
| | | | | 706/12 |
| 2014/0089035 | A1* | 3/2014 | Jericho | G07C 5/008 |
| | | | | 705/7.26 |
| 2014/0278641 | A1* | 9/2014 | Kleehammer | G06Q 10/06311 |
| | | | | 705/7.15 |
| 2014/0355750 | A1* | 12/2014 | Chan | H04M 3/5175 |
| | | | | 379/265.05 |
| 2015/0067140 | A1* | 3/2015 | Branch | H04L 41/147 |
| | | | | 709/224 |
| 2016/0357625 | A1* | 12/2016 | Balakrishnan | G06F 11/0709 |
| 2017/0140315 | A1* | 5/2017 | Cao | G06Q 10/06311 |
| 2017/0243112 | A1* | 8/2017 | Ekambaram | G06N 3/0454 |
| 2017/0262621 | A1* | 9/2017 | Venkataraman | G06F 21/335 |
| 2017/0300473 | A1* | 10/2017 | Bhattacharya | G06F 17/2725 |
| 2018/0114095 | A1* | 4/2018 | Han | G06F 17/30268 |
| 2018/0239752 | A1* | 8/2018 | Bhattacharya | G06F 17/2725 |

\* cited by examiner

CONTINUOUS LEARNING BASED SEMANTIC MATCHING FOR TEXTUAL SAMPLES

RELATED APPLICATION

This application claims priority under 35 U.S.C. § 119 to Indian Patent Application No. 201641029668, filed on Aug. 31, 2016, the content of which is incorporated by reference herein in its entirety.

BACKGROUND

A sample of text may include or be associated with various attributes that can be used to classify or process the sample, such as a syntax of the sample, particular words included in the sample, a length of the sample, or the like. A device may identify the various attributes based on a process such as natural language programming, and may process the sample based on the various attributes.

SUMMARY

A device may include one or more processors. The device may receive an input sample of textual content. The device may identify one or more comparison samples that are semantically similar to the input sample. The one or more comparison samples may be identified based on one or more similarity scores, of the one or more comparison samples and the input sample, satisfying a semantic similarity threshold. The device may identify a plurality of output samples of textual content based on acceptance information corresponding to the plurality of output samples and the one or more comparison samples. The acceptance information may be determined based on a user input regarding similarity or relevance of the plurality of output samples to the one or more comparison samples. The user input may be received before the input sample is received. The device may store or provide the plurality of output samples.

A method may include receiving, by a device, an input sample of textual content. The method may include identifying, by the device, a comparison sample that is semantically similar to the input sample. The comparison sample may be identified based on a similarity score, of the comparison sample and the input sample, satisfying a semantic similarity threshold. The method may include identifying, by the device, a plurality of output samples of textual content based on acceptance information corresponding to the plurality of output samples and the comparison sample. The acceptance information may be determined based on a user input regarding similarity or relevance of the plurality of output samples and the comparison sample, and the user input may be received before the input sample is received. The method may include storing or providing, by the device, the plurality of output samples.

A computer-readable medium may store one or more instructions that, when executed by one or more processors, cause the one or more processors to receive an input sample of textual content. The one or more instructions, when executed by the one or more processors, may cause the one or more processors to identify one or more comparison samples that are semantically similar to the input sample. The one or more comparison samples may be identified based on one or more similarity scores, of the one or more comparison samples and the input sample, satisfying a semantic similarity threshold. The one or more instructions, when executed by the one or more processors, may cause the one or more processors to identify a plurality of output samples of textual content based on acceptance information corresponding to the plurality of output samples and the one or more comparison samples. The acceptance information may be determined based on a user input regarding similarity or relevance of the plurality of output samples to the one or more comparison samples. The one or more instructions, when executed by the one or more processors, may cause the one or more processors to store or provide the plurality of output samples.

DETAILED DESCRIPTION

Figure 1A:
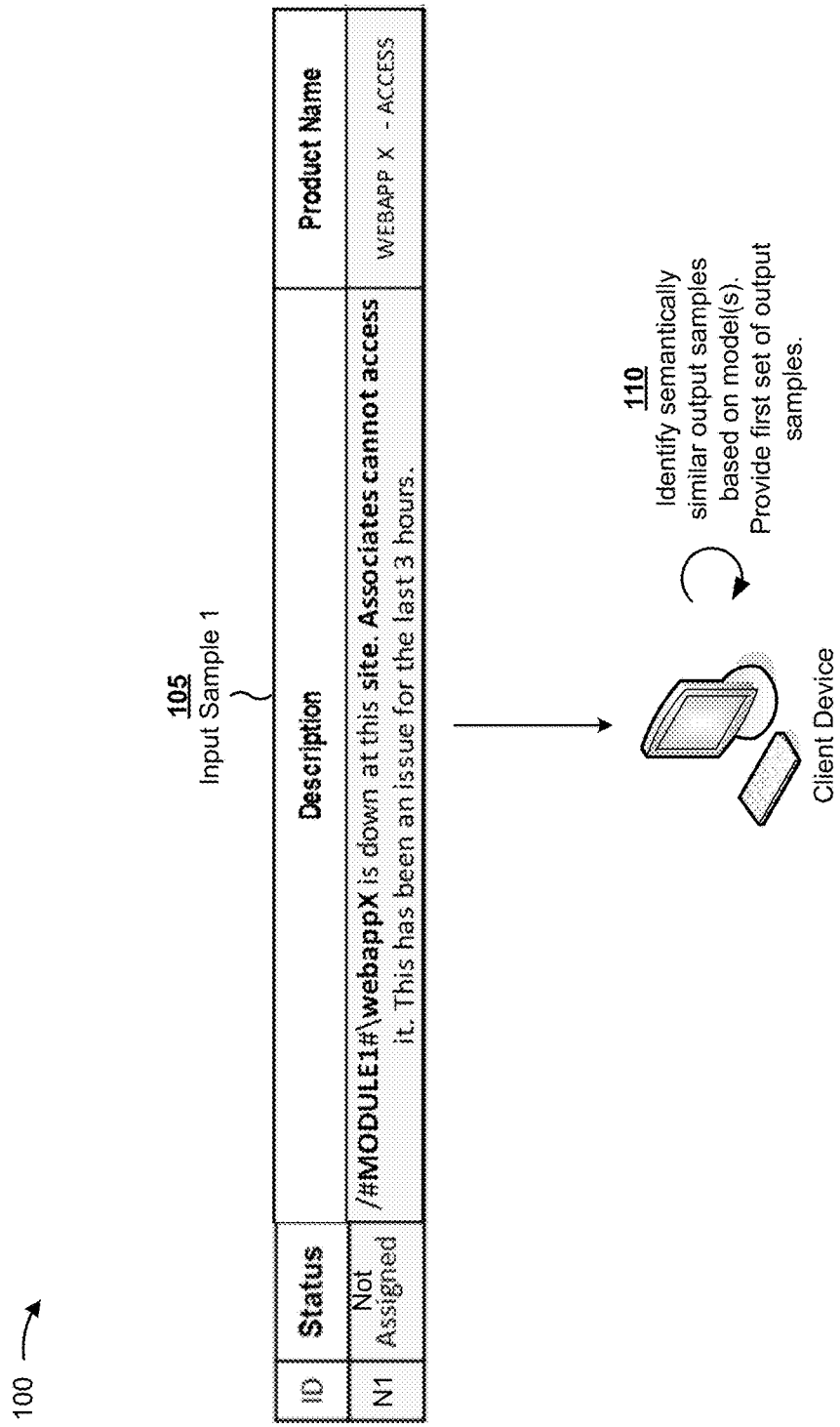
FIGS. 1A-1E are diagrams of an overview of an example implementation described herein.

The following detailed description of example implementations refers to the accompanying drawings. The same reference numbers in different drawings may identify the same or similar elements.

An entity (e.g., an information technology (IT) firm, a software designer, etc.) may implement an application to be used or accessed by end users. An end user may encounter an error, a flaw, an incident, or the like, related to the application. The entity may provide an incident reporting or service ticket system so that the end user can notify the entity of the incident, and so that the entity can assign a worker to investigate and/or resolve the incident. A worker may be particularly effective at investigating or resolving the incident when the worker has previously been assigned to resolve similar incidents and/or when the worker has previously been more effective than other workers at investigating or resolving similar incidents. Therefore, a device may identify similar service tickets or incident reports based on semantic similarity of the service tickets or incident reports (e.g., using a natural language processing algorithm), so that workers can be assigned to service tickets for which the workers may be best suited based on experience. For example, when a newer service ticket is similar to an older service ticket that was processed by a particular worker, an entity may assign the particular worker to process the newer service ticket.

However, automatically identifying similar incidents or service tickets may be difficult when end users describe an incident in different ways (e.g., using different terms, different syntactic structure, etc.), when differences exist between two incidents, when information regarding the incident is incomplete, or the like. Therefore, a pair of incidents that are semantically similar may not be particularly helpful for identifying suitable workers.

Implementations described herein identify output samples (e.g., textual samples, such as service tickets or incident reports) that are relevant to an input sample of textual content (e.g., a textual sample, such as a service ticket or incident report). The output samples may be samples that have previously been identified as relevant to another sample that is semantically similar to the input sample. The other sample may be referred to herein as a comparison sample.

Furthermore, implementations described herein identify the output samples based on the output samples being accepted by a user as relevant to the comparison sample. In other words, implementations described herein identify a comparison sample that is semantically similar to the input sample, identify output samples that have been accepted as relevant or similar to the comparison sample, and provide the output samples as relevant or similar to the input sample. Still further, implementations described herein may update a model for identifying output samples based on user input indicating whether the output samples are similar to or relevant to the input sample.

Based on the identified output samples, implementations described herein may select workers to be assigned to the input sample (e.g., based on performance of the workers with regard to the output samples). Furthermore, implementations described herein may predict performance of the workers with regard to the input sample based on performance of the workers with regard to the output samples.

In this way, implementations described herein improve accuracy of identification of relevant or similar samples by iteratively updating a model for identifying the relevant or similar samples, and by taking into account user-provided information that may specify whether the user considers the identified samples to be relevant or similar to an input sample. Furthermore, implementations described herein continuously improve selection of the identified samples based on continuously learning from the user-provided information. Further, implementations described herein improve allocation of workers based on identification of relevant or similar samples, and conserve computational resources that would otherwise be used to browse or identify samples from a set of irrelevant samples.

FIGS. 1A-1E are diagrams of an overview of an example implementation 100 described herein. As shown in FIG. 1A, and by reference number 105, a client device may receive a first input sample (e.g., input sample 1). The first input sample may be associated with a textual sample, such as an incident report, a service ticket, a document, or the like. In some implementations, the client device may receive the first input sample from another device. Additionally, or alternatively, the client device may receive the first input sample based on a user input. As further shown, the first input sample may be associated with an identifier (e.g., N1), a status (e.g., not assigned, indicating that the first input sample has not been assigned to a worker for resolution), a description of the first input sample (e.g., a textual description of an incident associated with the first input sample), and a product name (e.g., WEBAPP X-ACCESS).

As shown by reference number 110, the client device may identify relevant and/or similar samples for the first input sample based on one or more models, and may provide the relevant and/or similar samples as a first set of output samples. For example, the relevant and/or similar samples may be semantically similar to the first input sample, or may relate to a similar incident, problem, or job as the first input sample. The first set of output samples may be identified based on user feedback relating to the first set of output samples. For example, the first set of output samples may have previously been provided as potentially relevant or similar to another sample (e.g., a comparison sample), and may be associated with user feedback that indicates whether a user perceived the first set of output samples as potentially relevant or similar to the other sample. Thus, output samples are identified based on similarity to previous input samples, which improves accuracy of selection of the output samples.

Figure 1B:
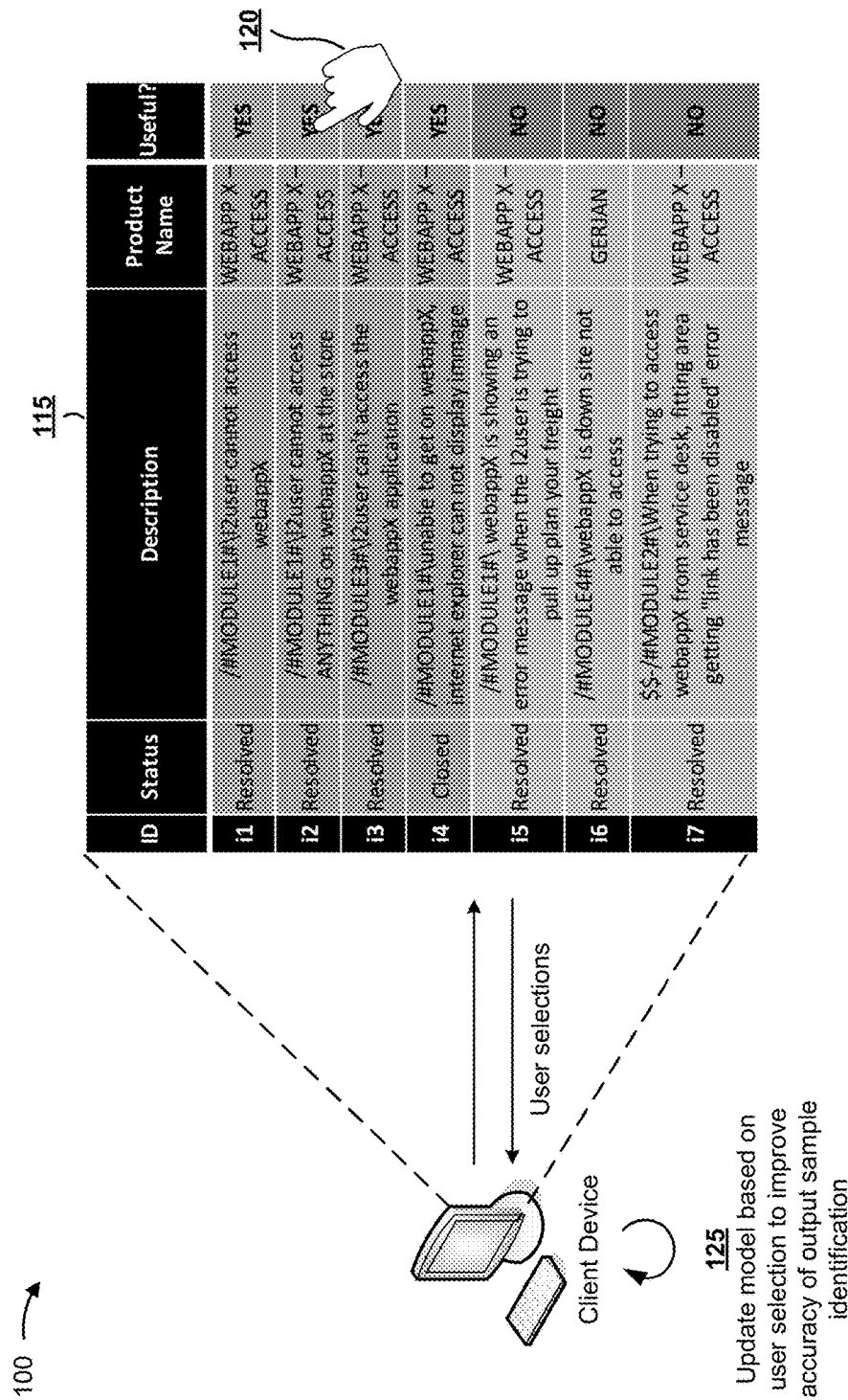

As shown in FIG. 1B, and by reference number 115, the client device may provide the first set of output samples for display. Here, the first set of output samples includes samples i1, i2, i3, i4, i5, i6, and i7. In some implementations, the client device may provide the first set of output samples to a device associated with an entity, and the device may provide the first set of output samples for display to the entity. As further shown, the client device may provide information associated with the first set of output samples (e.g., identifiers of the first set of output samples, descriptions associated with the first set of output samples, and product names associated with the first set of output samples).

As shown by reference number 120, the client device may receive user selections that specify whether a user perceives each of the output samples as useful or relevant to the first input sample. Based on the user selections, the client device may determine acceptance information regarding the first set of output samples. For example, the client device may store acceptance information that indicates whether each of the first set of output samples was accepted as useful with regard to the first input sample. As another example, the client device may store acceptance information that identifies shared terms between accepted output samples and the first input sample. As yet another example, the client device may store acceptance information that identifies non-shared terms between rejected output samples and the first input sample.

As shown by reference number 125, the client device may update the one or more models, based on the user selections, to improve accuracy of identification of output samples. For example, the one or more models may identify weights to be assigned to particular acceptance information when identifying output samples, and the client device may adjust the weights based on the user selections. As another example, the client device may determine similarity scores for pairs of samples based on the one or more models, and the client device may adjust the model so that similarity scores for output samples more closely match user preferences regarding the similarity scores. In this way, the client device adjusts or updates a model based on user selections regarding similar samples, which improves accuracy of selection of the similar samples.

Figure 1C:
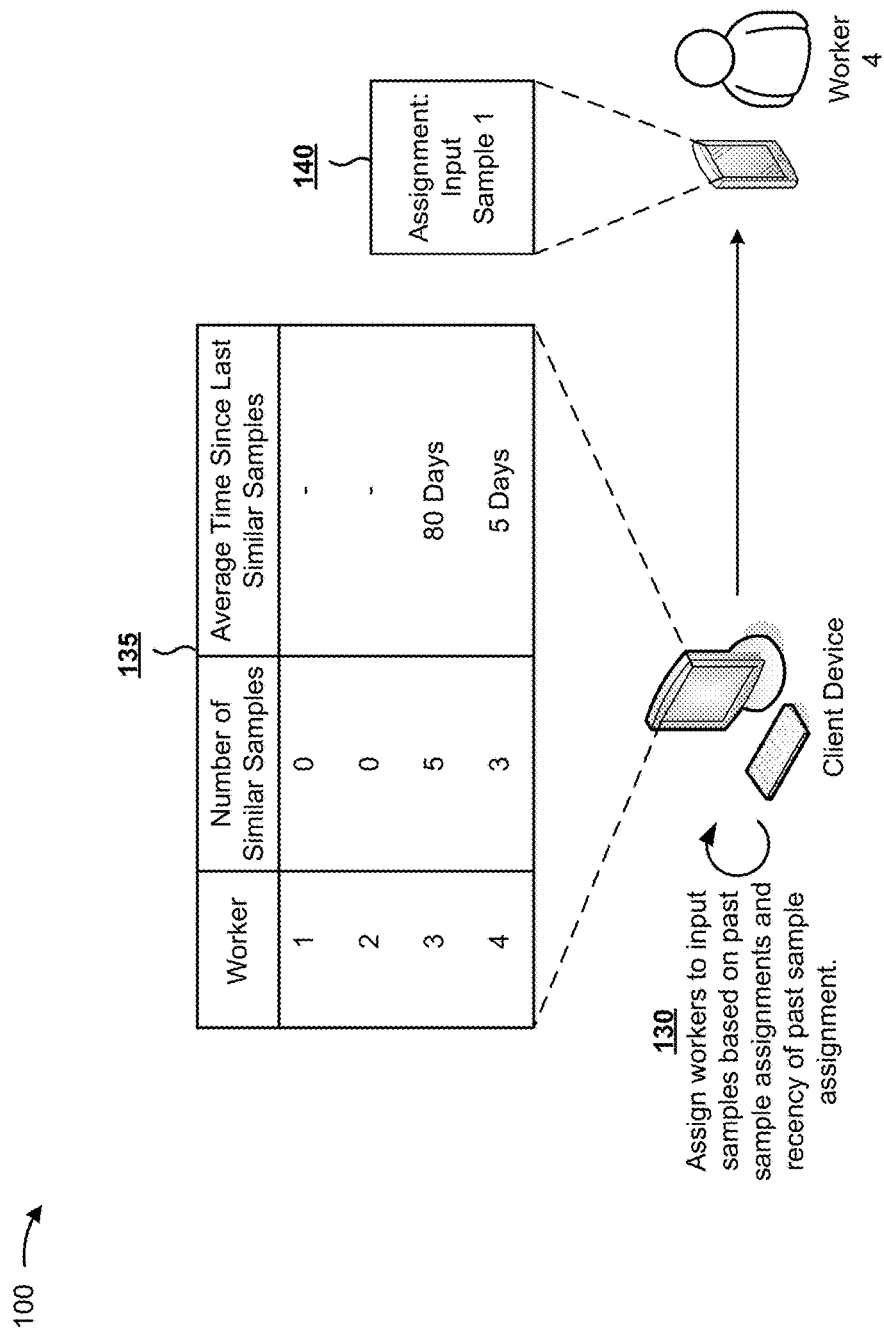

As shown in FIG. 1C, and by reference number 130, the client device may assign a worker to the first input sample. For example, when the first input sample includes an incident report or a service ticket, the client device may assign a worker to investigate and/or resolve an incident or issue associated with the first input sample (e.g., the incident or issue identified by the description associated with the first input sample, as shown in FIG. 1A). In some cases, the client device may identify one or more workers to be assigned to the first input sample, and may provide information that identifies the one or more workers to another device or entity. In such a case, the other device or entity may select, from the one or more workers, a selected worker to process the first input sample. Based on assigning the worker, the client device may provide information to the worker that indicates that the worker has been assigned to the first input sample. For example, the client device may send a message to the worker (e.g., an email message, a text message, etc.), may call the worker, may send a calendar entry to auto-populate to a calendar of the worker, or the like.

As further shown, the client device may select a worker based on past sample assignments associated with the worker, and based on time periods that have elapsed since the past sample assignments. For example, as shown by reference number 135, the client device may store or have access to information that identifies a quantity of similar samples to which each worker has been assigned, and that identifies an average length of time since each worker was assigned to a similar sample. Based on this information, the client device may assign a worker to the first input sample (e.g., based on a regression analysis, based on a model, based on availability of the worker, etc.). For example, the client device may assign the worker based on the worker having a shortest average length of time since the worker was assigned to a similar sample. Here, the client device assigns worker 4 to the first input sample. As shown by reference number 140, the client device may provide, to a device associated with worker 4, information that indicates that worker 4 is assigned to the first input sample. In this way, the client device facilitates assignment of workers to samples based on past performance of the workers with regard to similar samples, which improves expected performance of the workers with regard to the input samples, and which improves efficiency of allocation of organizational resources associated with the workers.

Figure 1D:
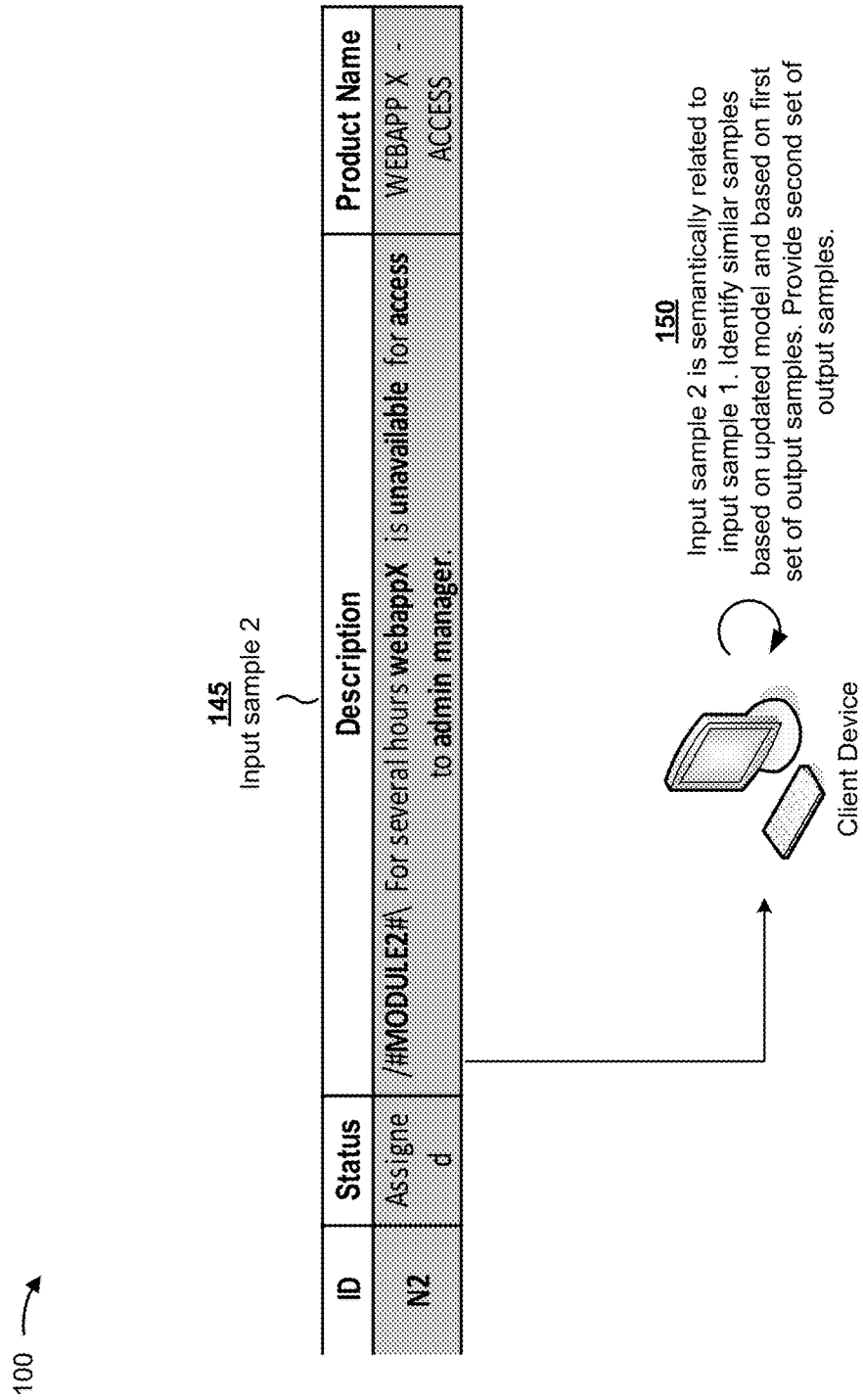

As shown in FIG. 1D, and by reference number 145, the client device may receive a second input sample (e.g., input sample 2). As further shown, the second input sample may include terms or attributes that are similar to the first input sample (e.g., a product name of WEBAPP X-ACCESS, the bolded terms in the description of the second input sample, etc.). As shown by reference number 150, the client device may determine that the second input sample is semantically similar to the first input sample (e.g., based on natural language processing, or the like).

As further shown, based on the first input sample being semantically similar to the second input sample, the client device may identify samples that are similar to the second input sample based on the updated model and based on the first set of output samples. For example, based on the user selections indicating whether the first set of output samples were relevant to the first input sample, and based on the updated model, the client device may select one or more samples, of the first set of output samples, to be provided as the second set of output samples with regard to the second input sample.

Figure 1E:
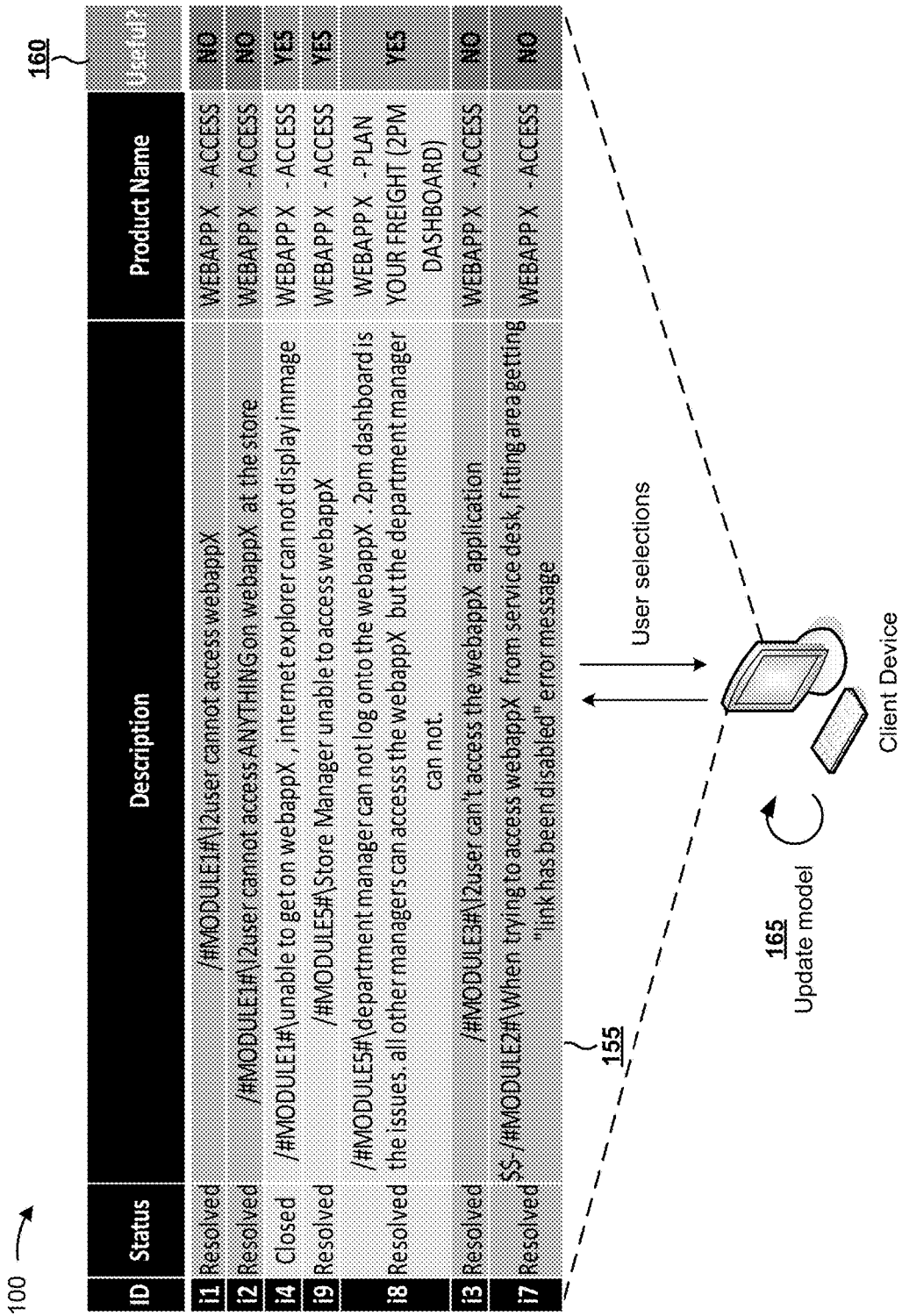

As shown in FIG. 1E, and by reference number 155, the client device may provide the second set of output samples for display. As further shown, the second set of output samples includes samples i1, i2, i3, i4, and i7, which were included in the first set of output samples. The second set of output samples may be identified based on the acceptance information associated with the first set of output samples. For example, when a particular sample, of the first set of output samples, is accepted as relevant to the first input sample, the particular sample may be ranked more highly in the second set of output samples than a sample that is rejected as irrelevant to the first input sample.

In some cases, the second set of output samples may be determined based on the updated model. For example, the updated model may assign particular weights to particular types of acceptance information (e.g., acceptance information corresponding to shared sets of terms, acceptance information corresponding to non-shared terms, acceptance information corresponding to accepted or rejected pairs of samples, etc.), may specify modifications to semantic similarity scores of the second set of output samples, or the like.

As shown by reference number 160, the client device may receive user input that specifies whether a user considers each of the second set of output samples to be relevant or similar to the second input sample. As shown by reference number 165, the client device may train or update the one or more models based on the user input. For example, the client device may store acceptance information that is determined based on the user input, may adjust weights or parameters corresponding to the acceptance information, may modify a method for determining one or more semantic similarity scores, or the like. In some implementations, the model may be trained or updated based on a machine learning algorithm, an artificial intelligence, or the like.

In this way, the client device uses a model, that is trained based on user-specified acceptance information, to identify semantically similar samples for input samples. Thus, the client device improves accuracy of the samples and facilitates matching of workers to tasks associated with the input samples. Further, implementations described herein improve allotment of organizational resources and conserve computational resources that would otherwise be used to assign, process, and/or provide inappropriate samples.

Figure 2:
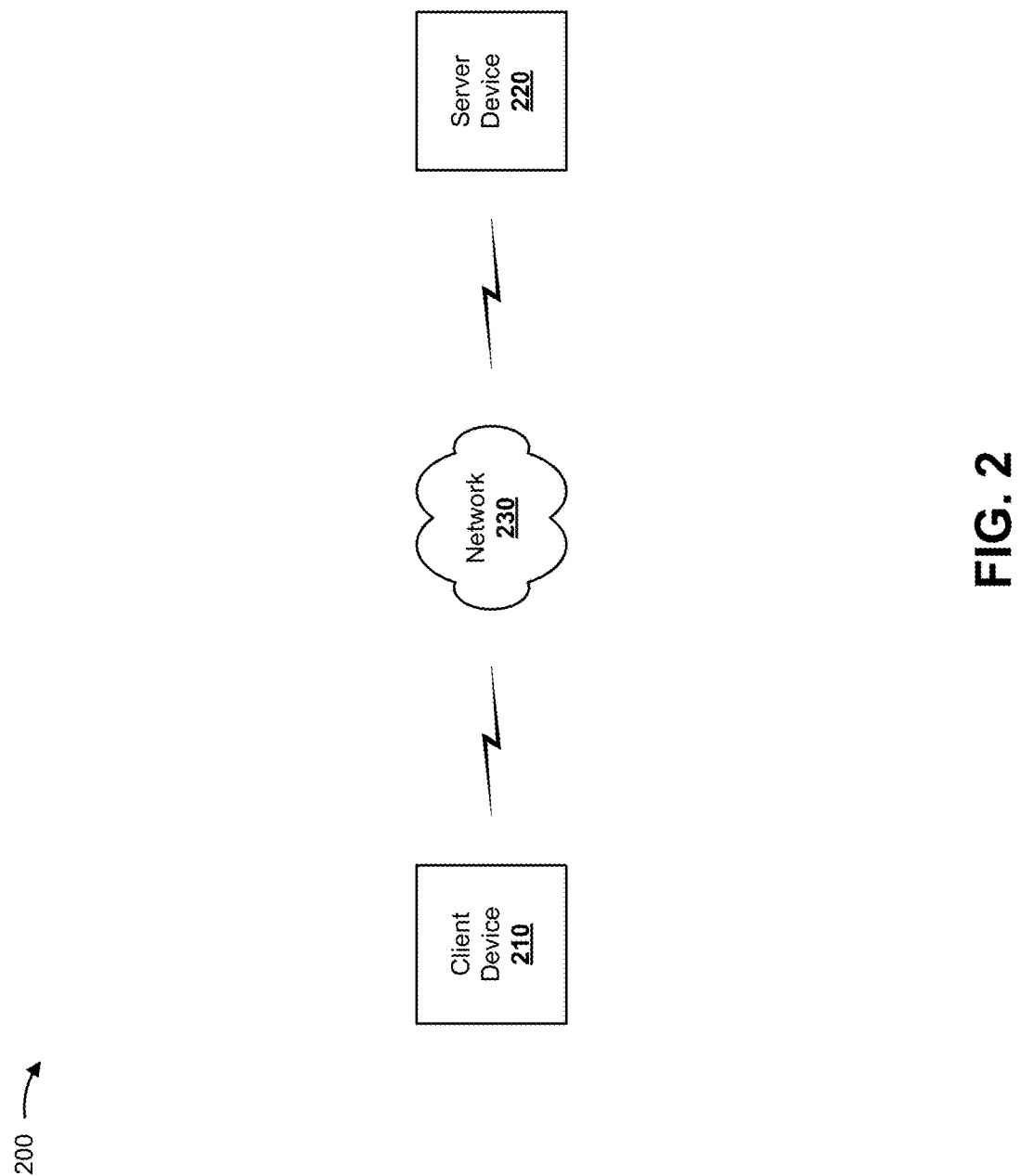
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 includes one or more devices capable of receiving, generating, storing, processing, and/or providing information associated with samples, such as textual samples. For example, client device 210 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

Server device 220 includes one or more devices capable of receiving, generating, storing, processing, and/or providing information associated with samples, such as sets of similar samples, worker information for workers that are to process service tickets corresponding to the samples, or the like. For example, server device 220 may include a server, a group of servers, a cloud computing environment, or the like.

In some implementations, server device 220 may be hosted in a cloud computing environment. In such a case, the cloud computing environment includes an environment that hosts server device 220. The cloud computing environment may provide computation, software, data access, storage, etc. services that do not require end-user (e.g., client device 210) knowledge of a physical location and configuration of system(s) and/or device(s) that hosts server device 220.

A cloud computing environment may include a group of computing resources. A computing resource includes one or more personal computers, workstation computers, server devices, or another type of computation and/or communication device. In some implementations, a computing resource may include or host server device 220, or may perform operations that are described herein as being performed by client device 210 or server device 220. The cloud resources may include compute instances executing in a computing resource, storage devices provided in a computing resource, data transfer devices provided by a computing resource, etc. In some implementations, a computing resource may communicate with other computing resources via wired connections, wireless connections, or a combination of wired and wireless connections.

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
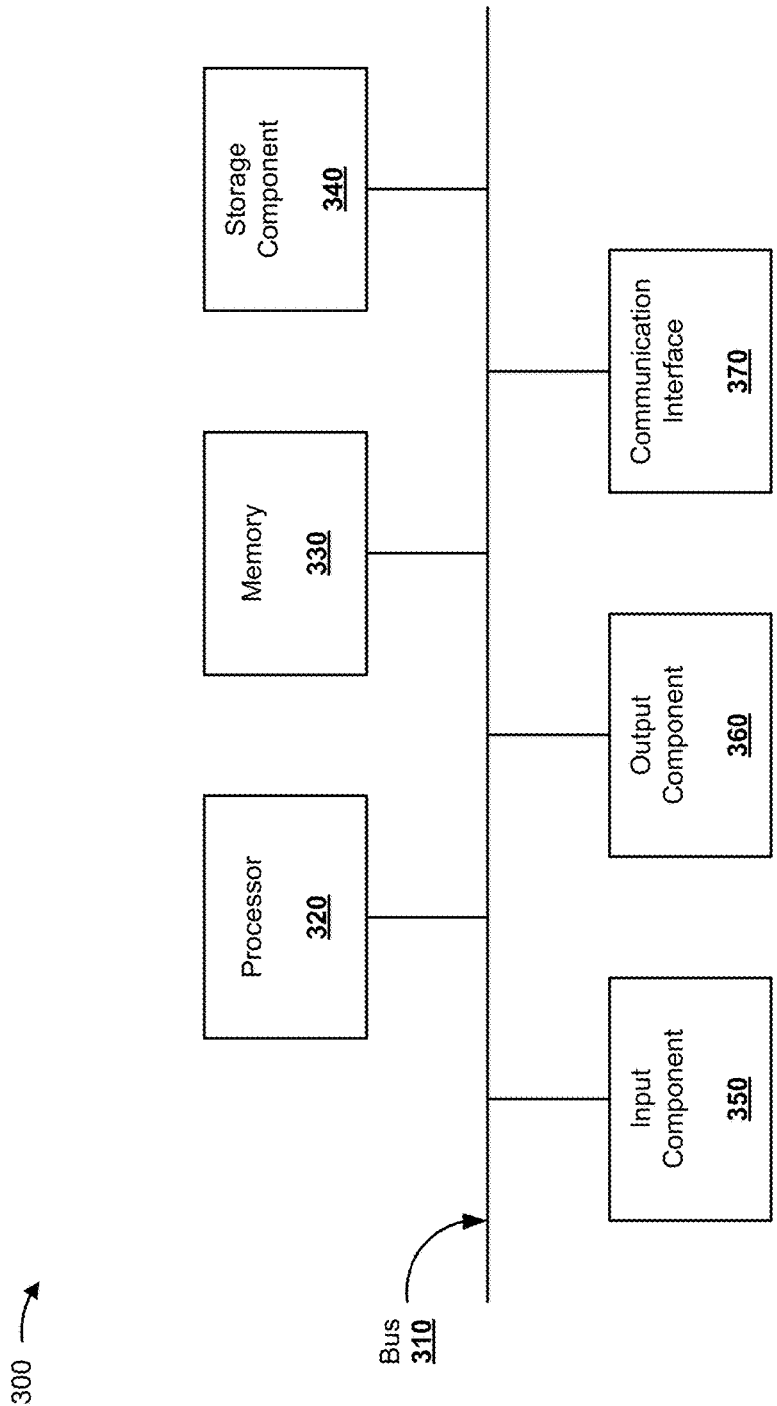
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 includes a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
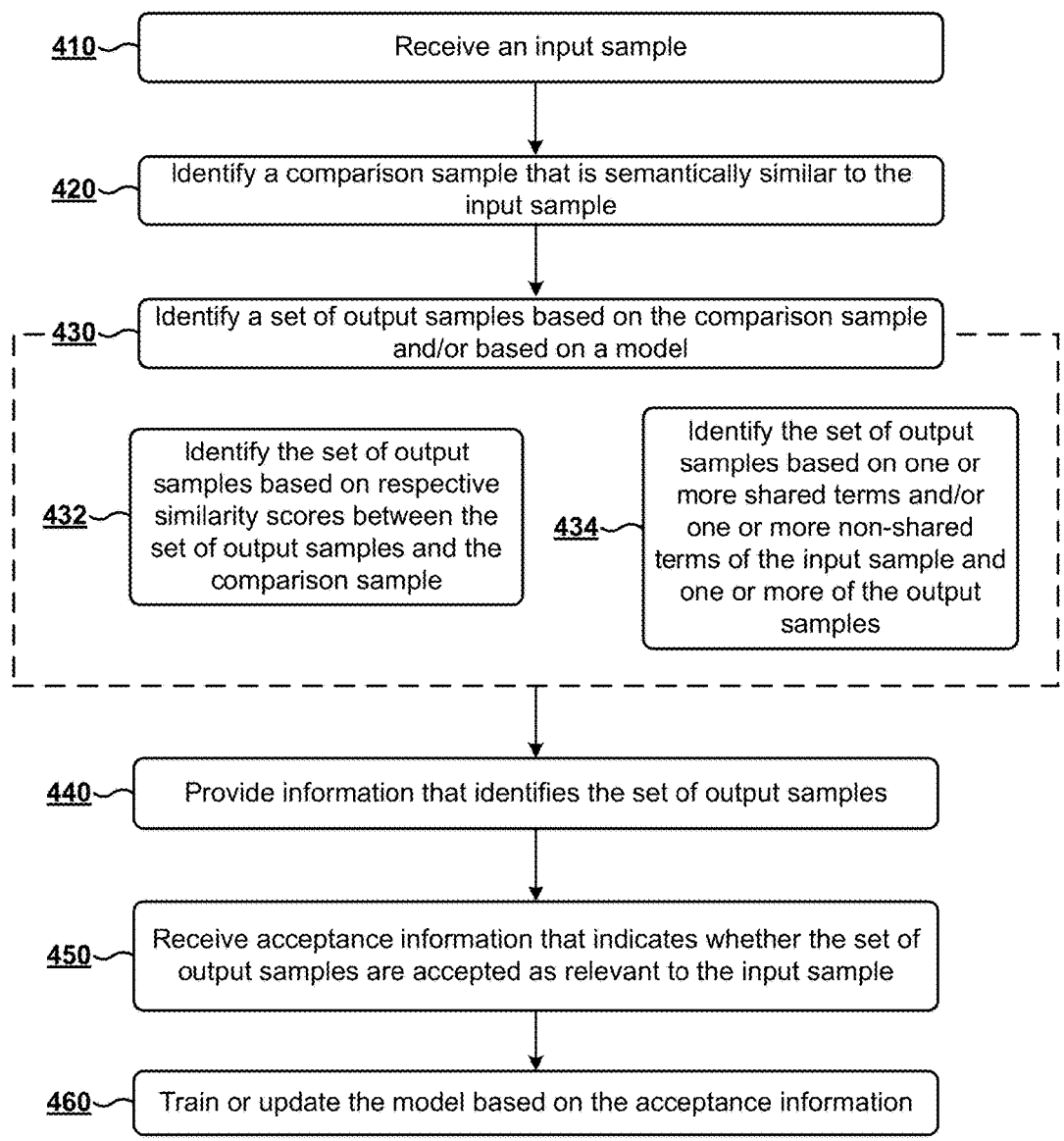
FIG. 4 is a flow chart of an example process for training a model, based on acceptance information, to identify similar textual samples.

FIG. 4 is a flow chart of an example process 400 for training a model, based on acceptance information, to identify similar textual samples. In some implementations, one or more process blocks of FIG. 4 may be performed by server device 220. In some implementations, one or more process blocks of FIG. 4 may be performed by another device or a group of devices separate from or including server device 220, such as client device 210.

As shown in FIG. 4, process 400 may include receiving an input sample (block 410). For example, server device 220 may receive an input sample (e.g., a textual sample). In some implementations, server device 220 may receive the input sample from client device 210. For example, client device 210 may receive or generate the input sample (e.g., based on user input, based on detecting an event or incident and generating the input sample based on the event or incident, etc.), and client device 210 may provide the input sample to server device 220. In some implementations, server device 220 may generate an input sample (e.g., based on detecting an event or incident and generating the input sample based on the event or incident, etc.)

The input sample may include a textual sample (e.g., a string of one or more characters, a string of one or more words and/or numbers, a phrase, a sentence, a paragraph, etc.). In some implementations, the input sample may be associated with an incident report relating to application maintenance, and textual content of the input sample may include the incident report. For example, the input sample may identify aberrant behavior of an application, may identify a requested feature of an application, or the like. In some implementations, the input sample may include or be associated with metadata regarding the input sample. In such a case, the metadata may identify a source of the input sample (e.g., a device or application that generated the input sample, a username associated with the input sample, etc.), a time or date associated with the input sample (e.g., a time or date when the input sample was generated or received, a time or date at which an incident associated with the input sample occurred, etc.), an application to which the input sample relates, an identifier associated with the input sample (e.g., a string of one or more characters that identifies the input sample), a status of the input sample (e.g., assigned, unassigned, resolved, closed, outstanding, etc.), or the like.

In some implementations, server device 220 may perform preprocessing of the input sample to improve efficiency and accuracy of natural language processing with regard to the input sample. For example, server device 220 may append a space before and/or after brackets (e.g., may change "a[b]" to "a [b]", which may improve accuracy of natural language processing with regard to the input sample). As another example, server device 220 may remove extraneous spaces between words, symbols, and/or characters of the input sample. As yet another example, server device 220 may remove stop words from the input sample. A stop word is a word that occurs commonly in a language, and that is removed before natural language processing (e.g., the, is, at, which, etc.) to reduce noise and improve accuracy of natural language processing. As still another example, server device 220 may replace a string with an acronym corresponding to the string (e.g., "IT" may be replaced with "information technology"). As yet another example, server device 220 may perform a spelling correction operation on the input sample. As another example, server device 220 may identify synonyms associated with attributes (e.g., words, phrases, abbreviations, etc.) of the input sample. Thus, server device 220 improves accuracy of natural language processing with regard to the input sample.

As further shown in FIG. 4, process 400 may include identifying a comparison sample that is semantically similar to the input sample (block 420). For example, server device 220 may identify a comparison sample based on the comparison sample being semantically similar to the input sample. A comparison sample may include a sample that has previously been received as an input sample, and that is associated with a set of output samples that have previously been provided as similar to the comparison sample. The set of output samples may be associated with acceptance information indicating whether the set of output samples were accepted as relevant or similar to the comparison sample. Based on the acceptance information, and based on the comparison sample being semantically similar to the input sample, server device 220 may select one or more of the output samples associated with the comparison samples as output samples for the input sample.

In some implementations, server device 220 may identify the comparison sample based on natural language processing. For example, server device 220 may identify attributes of the input sample and the comparison sample, and may determine that the attributes of the input sample and the comparison sample are similar. In some implementations, server device 220 may determine a similarity score for the input sample and the comparison sample. A similarity score may identify or indicate a level of semantic similarity between two samples. In some implementations, server device 220 may determine the similarity score based on a model. Server device 220 may train the model based on a training set of input samples, comparison samples, and similarity scores associated with the input samples and the comparison samples. For example, the model may be trained based on a machine learning algorithm, an artificial intelligence process, or the like.

In some implementations, server device 220 may identify a comparison sample based on a similarity score of the comparison sample satisfying a semantic similarity threshold with regard to the input sample. When the similarity score of a particular sample satisfies the semantic similarity threshold with regard to the input sample, server device 220 may determine that the particular sample is sufficiently similar to the input sample to be used as a comparison sample for the input sample.

In some implementations, server device 220 may determine that a comparison sample is identical or substantially identical to an input sample. In such a case, the comparison sample may be referred to as a duplicate sample of the input sample. Server device 220 may identify a duplicate sample based on a duplication threshold of a similarity score associated with the duplicate sample. For example, when a similarity score of a pair of samples satisfies the duplication threshold, server device 220 may determine that the pair of samples are likely to be duplicate samples. In some implementations, the duplication threshold may be a higher threshold than the semantic similarity threshold. For example, a pair of samples may need to be more semantically similar to satisfy the duplication threshold than the semantic similarity threshold.

By identifying duplicate samples, server device 220 simplifies identification of output samples. For example, assume that a particular sample is associated with acceptance information indicating that the particular sample was identified as relevant or similar to a comparison sample. When the comparison sample is a duplicate sample of an input sample, server device 220 may automatically select the particular sample as an output sample for the input sample. In this way, server device 220 conserves computational resources that would otherwise be used to perform additional operations to identify the particular sample as an output sample.

As further shown in FIG. 4, process 400 may include identifying a set of output samples based on the comparison sample and/or based on a model (block 430). For example, server device 220 may identify a set of output samples that may be relevant to or similar to the input sample. Server device 220 may select the set of output samples from a pool of potential samples that are associated with acceptance information corresponding to the comparison sample. In some implementations, server device 220 may identify the set of output samples based on similarity scores between the set of output samples and the comparison sample, as described in more detail in connection with block 432, below. Additionally, or alternatively, server device 220 may identify the set of output samples based on one or more shared terms or attributes, and/or based on one or more non-shared terms or attributes, associated with the input sample and/or one or more output samples of the set of output samples, as described in more detail in connection with block 434, below.

Server device 220 may identify the set of output samples based on a model and/or based on natural language processing. For example, server device 220 may identify attributes of the input sample and the comparison sample based on natural language processing. Server device 220 may use the attributes of the input sample and the comparison sample as inputs to a model, and the model may output information that identifies the set of output samples. For example, server device 220 may store or have access to acceptance information regarding the set of output samples and the comparison sample, and may identify the set of output samples based on the acceptance information. Additionally, or alternatively, the acceptance information may be provided to the model as an input. Thus, server device 220 improves accuracy of identifying output samples and reduces reliance on manual means of identifying similar samples. Furthermore, by using the acceptance information as input to the model, server device 220 conserves processor resources that would otherwise be used to select samples from a larger set of input samples. For example, server device 220 may not consider samples that are not associated with acceptance information, which conserves processor resources.

In some implementations, the model may be trained based on a training set of samples. For example, server device 220 may train the model based on a machine learning algorithm, such as an artificial intelligence system, a neural networking system, a deep learning system, or the like. To train the model, server device 220 may input, to the machine learning algorithm, a training set that identifies an input sample, a set of output samples, and acceptance information associated with the set of output samples. In some implementations, the set of output samples may be associated with respective similarity scores that are determined based on semantic similarity of the output samples to the input sample. Server device 220 may train the model based on the training set, which may improve accuracy of identification of output samples and may conserve computational and organizational resources that would otherwise be used to manually specify rules for identifying output samples. In some implementations, server device 220 may update or further train the model based on user input indicating whether the output samples are perceived as relevant to or similar to the input sample (e.g., acceptance information), which is described in more detail in connection with block 460, below. Furthermore, as the model is trained, accuracy of the model may improve, thus conserving computational resources that would otherwise be used to identify irrelevant samples and/or search for additional samples after irrelevant samples are provided to a user.

In some implementations, the model may identify a modification to a similarity score of an output sample based on acceptance information associated with the output sample. For example, server device 220 may determine an initial similarity score for an input sample and an output sample based on semantic similarity of the input sample and the output sample. Server device 220 may identify a modification to the initial similarity score based on the model and based on acceptance information associated with the output sample. For example, when the acceptance information for the output sample indicates that the output sample was accepted as relevant or similar to the input sample, server device 220 may increase the initial similarity score to determine a final similarity score. As another example, when the acceptance information for the output sample indicates that the output sample was rejected as irrelevant or dissimilar to the input sample, server device 220 may decrease the initial similarity score to determine the final similarity score. Server device 220 may select and/or rank output scores based on the final similarity scores, may provide information that identifies the final similarity scores to client device 210, or the like. A technical description of a process for calculating increases or decreases to initial similarity scores is described in more detail in connection with blocks 432 and 434, below.

As further shown in FIG. 4, process 400 may include identifying the set of output samples based on respective similarity scores between the set of output samples and the comparison sample (block 432). For example, server device 220 may identify the set of output samples based on a set of similarity scores corresponding to the set of output samples and the comparison sample. Server device 220 may select the set of output samples based on semantic similarity between the input sample and the output samples, and based on the acceptance information associated with the set of output samples. For example, server device 220 may determine similarity scores between the input sample and the output samples, and may adjust the similarity scores, based on acceptance information indicating whether the output samples were relevant or similar to the comparison sample (e.g., based on the model), to determine final similarity scores. In this way, server device 220 identifies similar samples that are similar to an input sample, based on whether the output samples were previously accepted as similar or related to a comparison sample. Thus, server device 220 improves accuracy of identification of output samples based on historical user input regarding the similar samples.

In some implementations, server device 220 may determine that the input sample and the comparison sample are associated with a similarity score that satisfies a duplication threshold. The duplication threshold may identify a similarity score that indicates that the input sample and the comparison sample are identical or substantially identical. When server device 220 determines that the similarity score of the input sample and the comparison sample satisfies the duplication threshold, server device 220 may automatically select, or reject, output samples based on acceptance information associated with the output samples. For example, server device 220 may automatically reject, as output samples, samples that are associated with acceptance information indicating that the output samples were not accepted as similar to the comparison sample. As another example, server device 220 may automatically accept, as output samples, samples that are associated with acceptance information indicating that the samples were accepted as similar to the comparison sample. In this way, server device 220 conserves processor resources that would otherwise be used to determine similarity scores between the accepted or rejected samples and the comparison sample (e.g., based on the model, based on additional factors or operations, etc.).

As further shown in FIG. 4, process 400 may include identifying the set of output samples based on one or more shared terms and/or one or more non-shared terms of the input sample and one or more of the output samples (block 434). For example, server device 220 may identify the set of similar samples based on a shared set of terms or attributes that are shared between the input sample and the output samples. Additionally, or alternatively, server device 220 may identify the set of similar samples based on one or more non-shared terms that are not common between the input sample and the output samples.

In some implementations, server device 220 may identify the set of output samples based on a shared set of terms. A shared set of terms is a set of terms that occurs in a pair of samples (e.g., an input sample and a recommended sample that may be similar or related to the input sample). For example, assume that a pair of samples includes a first sample of "The family runs to the park" and a second sample of "The family drives to the park." In such a case, the shared set of terms of the pair of samples may include "The," "family," "to," "the," and "park."

In some implementations, server device 220 may store or have access to acceptance information corresponding to shared sets of terms. For example, when a shared set of terms is included in a pair of samples that have been specified as similar or related (e.g., based on a user input identifying the pair of samples as similar or related), server device 220 may store acceptance information indicating that the shared set of terms is indicative of a similar sample pair. In some implementations, the acceptance information for the shared set of terms may include a set of positive term ratings corresponding to the terms of the shared set of terms. The positive term rating for each term may be modified (e.g., increased, decreased, etc.) based on each term being included in a shared set of terms. In this way, server device 220 determines acceptance information based on user acceptance of samples that have shared sets of terms. Further, server device 220 enables identification of potentially similar or relevant samples based on the shared sets of terms, thus improving accuracy of the identification of potentially similar samples.

In some implementations, server device 220 may identify a potentially similar sample based on acceptance information. For example, assume that server device 220 is to identify a set of similar samples that are similar to a particular sample. In such a case, server device 220 may identify sets of terms in the particular sample that are associated with acceptance information, and may select samples that share the sets of terms as potentially relevant samples. Server device 220 may identify output samples from a set of potentially relevant samples.

In some implementations, server device 220 may identify an output sample for an input sample based on positive term ratings associated with one or more sets of shared terms included in the input sample and/or the output sample. For example, when the input sample and the output sample include a set of shared terms that is associated with a positive term rating, server device 220 may determine or modify a similarity score for the input sample and the output sample based on the positive term rating. As another example, when the input sample and the output sample include multiple, different sets of shared terms, server device 220 may determine or modify a similarity score based on multiple, different positive term ratings corresponding to the multiple, different sets of shared terms (e.g., based on an average of the positive term ratings, based on a weighted average of the positive term ratings, based on a highest positive term rating of the multiple, different positive term ratings, etc.). In this way, server device 220 identifies output samples based on acceptance information regarding terms included in the similar samples, which improves accuracy of the identified output samples.

In some implementations, server device 220 may identify the set of output samples based on non-shared terms of the set of similar samples. A non-shared term, for a pair of samples, is a term that is present in only one sample of the pair of samples. For example, assume that a pair of samples includes a first sample of "John is a doctor" and a second sample of "Bill is a lawyer." In such a case, the non-shared terms of the pair of samples may include "John," "Bill," "doctor," and "lawyer." In some cases, a non-shared term may be indicative of an unrelated or irrelevant pair of samples.

In some implementations, server device 220 may identify a non-shared term when server device 220 receives acceptance information pertaining to a pair of samples that includes the non-shared term. For example, when server device 220 receives information indicating that a user has identified the pair of samples as unrelated or dissimilar (e.g., a binary value indicating that the pair of samples are dissimilar, a rating on a scale that indicates that the pair of samples are dissimilar, etc.), server device 220 may identify a non-shared set of terms of the pair of samples, and may store or provide acceptance information corresponding to the non-shared set of terms. The acceptance information may indicate that each non-shared term was associated with a dissimilar pair of samples. For example, the acceptance information for each non-shared term may include a respective negative term rating that is modified (e.g., increased, decreased, etc.) based on each non-shared term being associated with a dissimilar pair of samples.

In some implementations, server device 220 may identify an output sample for an input sample based on negative term ratings associated with one or more non-shared terms included in the input sample or the output sample. For example, when a non-shared term of the input sample or the output sample is associated with a negative term rating, server device 220 may determine or modify (e.g., decrease) a similarity score for the input sample and the output sample based on the negative term rating. As another example, when the input sample and the output sample include multiple, different non-shared terms, server device 220 may determine or modify (e.g., decrease) a similarity score based on multiple, different negative term ratings corresponding to the multiple, different non-shared terms (e.g., based on an average of the negative term ratings, based on a weighted average of the negative term ratings, based on a highest or largest negative term rating of the multiple, different negative term ratings, etc.). In this way, server device 220 identifies output samples based on acceptance information regarding non-shared terms of the output samples, which improves accuracy of the identified output samples.

In some implementations, server device 220 may identify an output sample based on one or more positive term ratings and based on one or more negative term ratings. For example, assume that a pair of samples includes a shared set of terms with a particular positive term rating, and assume that the pair of samples includes a non-shared term with a particular negative term rating. In such a case, server device 220 may determine a similarity score for the pair of samples based on the particular positive term rating and the particular negative term rating. In some implementations, server device 220 may determine an initial similarity score for the pair of samples (e.g., based on a natural language processing algorithm, or the like), and may adjust the initial similarity score, based on the particular positive term rating and the particular negative term rating, to determine a final similarity score. For example, server device 220 may adjust the initial similarity score based on the model, as described in more detail in connection with block 430, above.

In some implementations, server device 220 may identify output samples for an input sample based on positive and/or negative term ratings associated with the output samples and one or more comparison samples (e.g., as described in connection with block 434), and based on similarity scores of the output samples to one or more comparison samples (e.g., as described in connection with block 432, above). For example, consider the following equations 1 through 4:

$$(\text{Sim}_{new}(I_{new}, \text{Reco})) \Leftrightarrow \oplus(C_1, C_2, C_3) \quad \text{Equation 1.}$$

In Equation 1, $\text{Sim}_{new}$ is a final similarity score for an input sample (e.g., $I_{new}$) and a recommended sample for which a similarity score is to be determined (e.g., Reco). As shown by equation 1, the final similarity score $Sim_{new}$ may be determined based on one of $C_1$, $C_2$, or $C_3$, which are defined based on equation 2, equation 3, and equation 4, respectively. Equations 2 and 3 are shown below:

$$C_1: Sim(I_{new}, I_{old}) \geq \delta_{dup} \Rightarrow ((I_{new} \sim I_{old}) \wedge (Reco \sim R)$$
$$\wedge Accepted(I_{old}, R)) \Rightarrow (Sim_{new}(I_{new}, Reco)$$
$$= Max) \qquad \text{Equation 2 } (C_1), \text{ and}$$

$$C_2: Sim(I_{new}, I_{old}) \geq \delta_{dup} \Rightarrow (((I_{new} \sim I_{old}) \wedge (Reco \sim R)$$
$$\char`\^ Rejected(I_{old}, R)) \Rightarrow (Sim_{new}(I_{new}, Reco) = Min)) \text{Equation 2 } (C_2),$$

Equation 2 may be used to determine $Sim_{new}$ when Reco, or a sample that is similar to or identical to Reco (e.g., R) has previously been provided as an output sample with regard to a comparison sample (e.g., $I_{old}$), and when Reco or R is associated with acceptance information indicating that Reco or R was accepted as similar to $I_{old}$. In such a case, server device 220 may determine a value of $Sim_{new}$ to be a maximum value (e.g., Max). Additionally, or alternatively, server device 220 may automatically select Reco as an output sample for $I_{new}$. In this way, server device 220 determines a value of $Sim_{new}$ based on Reco having previously been accepted as similar to $L_{old}$, which indicates that Reco is likely to be similar to $I_{new}$.

Equation 3 may be used to determine $Sim_{new}$ when Reco or R has previously been provided as a similar sample with regard to $I_{old}$, and when Reco or R is associated with acceptance information indicating that Reco or R was rejected as dissimilar to $I_{old}$. In such a case, server device 220 may determine a value of $Sim_{new}$ to be a minimum value (e.g., Min). Additionally, or alternatively, server device 220 may automatically reject Reco as an output sample based on Reco or R being rejected as dissimilar to $I_{old}$. In this way, server device 220 determines a value of $Sim_{new}$ based on Reco having previously been rejected as dissimilar to $I_{old}$, which indicates that Reco is unlikely to be similar to $I_{new}$.

Server device 220 may determine $Sim_{new}$ based on equations 2 and 3 when a similarity score between $I_{new}$ and $I_{old}$ (e.g., $Sim(I_{new}, I_{old})$) satisfies a duplication threshold (e.g., $\delta_{dup}$). In some cases, $Sim(I_{new}, I_{old})$ may not satisfy the duplication threshold. In such a case, server device 220 may determine whether $Sim(I_{new}, I_{old})$ satisfies a rejection threshold (e.g., $\delta_{ur}$). When $Sim(I_{new}, I_{old})$ does not satisfy the rejection threshold (e.g., is less than the rejection threshold), server device 220 may reject Reco and/or $I_{old}$ as irrelevant to $I_{new}$. When $Sim(I_{new}, I_{old})$ is between the rejection threshold and the duplication threshold (i.e., when $Sim(I_{new}, I_{old})$ satisfies the rejection threshold and not the duplication threshold), server device 220 may determine $Sim_{new}$ based on equation 4, below:

$$C_3: \begin{pmatrix} \delta_{ur} < Sim(I_{new}, I_{old}) < \delta_{dup} \Rightarrow \\ Sim_{new}(I_{new}, Reco) = \alpha_1 \Delta_1 + \alpha_2 \Delta_2 + \alpha_3 \Delta_3 + \\ \alpha_4 \Delta_4 + \alpha_5 \Delta_5 \end{pmatrix} \qquad \text{Equation 4}(C_3)$$

In equation 4, $\alpha_1$, $\alpha_2$, $\alpha_3$, $\alpha_4$, and as may include coefficients based on which values of $\Delta_1$, $\Delta_2$, $\Delta_3$, $\Delta_4$, and $\Delta_5$ are adjusted. In some implementations, $\alpha_1$, $\alpha_2$, $\alpha_3$, $\alpha_4$, and $\alpha_5$ may be configured based on a machine learning algorithm, or the like. In some implementations, $\alpha_1$, $\alpha_2$, $\alpha_3$, $\alpha_4$, and as may be determined based on a linear convex combination. That is, $\alpha_1$, $\alpha_2$, $\alpha_3$, $\alpha_4$, and $\alpha_5$ may each be greater than or equal to zero, and $\alpha_1 + \alpha_2 + + \alpha_3 + \alpha_4 + \alpha_5$ may be equal to 1.

$\Delta_1$ may include an initial similarity score between $I_{new}$ and Reco based on semantic similarity of $I_{new}$ and Reco. For example, $\Delta_1$ may be determined based on natural language processing, or the like. $\Delta_2$ may include a modified value of $\Delta_1$, and may be increased when Reco is associated with acceptance information indicating that Reco was accepted as similar to one or more comparison samples. $\Delta_3$ may include a modified value of $\Delta_1$, and may be decreased when Reco is associated with acceptance information indicating that Reco was rejected as dissimilar to one or more comparison samples.

$\Delta_4$ may include a similarity score that is determined based on acceptance information corresponding to one or more shared sets of terms associated with $I_{new}$ and Reco. For example, $\Delta_4$ may be increased when the one or more shared sets of terms were accepted as relevant with regard to one or more pairs of samples other than $I_{new}$ and Reco. In other words, $\Delta_4$ may be determined based on positive term ratings corresponding to the one or more shared sets of terms and comparison samples. In some implementations, when $I_{new}$ and Reco include multiple, different shared sets of terms, $\Delta_4$ may be determined based on combining positive term ratings associated with each of the multiple, different shared sets of terms.

$\Delta_5$ may include a similarity score that is determined based on acceptance information corresponding to one or more non-shared terms associated with $I_{new}$ or Reco. For example, $\Delta_5$ may be decreased when acceptance information indicates that the one or more non-shared terms were included in one or more pairs of samples that were rejected as dissimilar or unrelated. In other words, $\Delta_5$ may be determined based on negative term ratings corresponding to the one or more non-shared terms.

In this way, server device 220 selectively determines a final similarity score for $I_{new}$ based on Equation 2 (e.g., when Reco has previously been accepted as similar to $I_{old}$ and when $I_{new}$ satisfies a duplication threshold with regard to $I_{old}$), Equation 3 (e.g., when Reco has previously been rejected as dissimilar to $I_{old}$ and when $I_{new}$ satisfies the duplication threshold with regard to $I_{old}$), or Equation 4 (e.g., when $I_{new}$ does not satisfy the duplication threshold or a rejection threshold with regard to $I_{old}$). Server device 220 determines the final similarity score based on acceptance information associated with terms included in $I_{new}$ and/or Reco, and/or based on acceptance information associated with Reco, which is determined based on user input regarding whether Reco is similar to one or more comparison samples. In this way, the relevance of the identified set of similar samples is improved based on acceptance information associated with the set of similar samples.

As further shown in FIG. 4, process 400 may include providing information that identifies the set of output samples (block 440). For example, server device 220 may provide information that identifies the set of output samples. In some implementations, server device 220 may provide the set of output samples to client device 210. For example, server device 220 may provide the set of output samples to be displayed by client device 210 to a user associated with client device 210.

In some implementations, server device 220 may provide information associated with the set of output samples. For example, server device 220 may provide final similarity scores associated with the set of output samples. As another example, server device 220 may provide information that indicates whether one or more samples are potentially duplicate samples. As yet another example, server device 220 may provide metadata regarding the set of output samples (e.g., information that identifies a number of output samples identified, a product or service to which the output samples relate, temporal information (e.g., date, time, etc.) associated with the set of output samples, past acceptance information associated with the output samples, identifiers corresponding to the output samples, etc.).

As further shown in FIG. 4, process 400 may include receiving acceptance information that indicates whether the set of output samples are accepted as relevant to the input sample (block 450). For example, server device 220 may receive acceptance information corresponding to the set of output samples. The acceptance information may indicate whether one or more output samples, of the set of output samples, are accepted as relevant or similar to the input sample. In some implementations, client device 210 may provide the set of output samples for display to a user (e.g., a technician, an information technology employee, a worker, etc.) via a graphical user interface, and the user may interact with the graphical user interface to provide the acceptance information. In such a case, client device 210 may provide the acceptance information to server device 220.

In some implementations, the acceptance information may include a binary indication of whether an output sample is accepted as similar or relevant to the input sample (e.g., yes or no, similar or dissimilar, accept or reject, etc.). By determining binary acceptance information, server device 220 conserves processor and/or storage resources that would otherwise be used to process more granular acceptance information. In some implementations, the acceptance information may include a rating of similarity of an output sample to an input sample. For example, the acceptance information may include a rating out of five stars, a rating out of ten points, or the like. Additionally, or alternatively, the acceptance information may include a ranking of the output samples based on relevance. For example, a user may specify an ordered list of the output samples based on relevance to the input sample. By using ratings of similarity and/or rankings of the output samples, server device 220 improves accuracy of the acceptance information.

As further shown in FIG. 4, process 400 may include training or updating the model based on the acceptance information (block 460). For example, server device 220 may train the model based on the acceptance information. In some implementations, server device 220 may train the model based on a machine learning algorithm, an artificial intelligence, or the like. For example, server device 220 may adjust parameters of the model based on the final similarity scores determined by the model and the acceptance information for the set of output samples. As a more particular example, server device 220 may adjust values of $\alpha_1, \alpha_2, \alpha_3, \alpha_4,$ and $\alpha_5$ of equation 4 based on the machine learning algorithm. In this way, server device 220 assigns weights to positive term ratings, negative term ratings, and acceptance information for accepted or rejected pairs of samples.

In some implementations, server device 220 may store acceptance information regarding pairs of samples, of an original input sample and a set of output samples. For example, server device 220 may store information that indicates whether a pair of samples, of the original input sample and the set of output samples, was accepted or rejected. Server device 220 may use the stored acceptance information to identify similar samples for a later input sample. For example, when the later input sample is semantically similar to the original input sample, server device 220 may select similar samples, of the set of output samples, that were accepted with regard to the original input sample. By selecting the similar samples for the later input sample based on the acceptance information for the original input sample, server device 220 improves accuracy of selection of the similar samples. Furthermore, server device 220 conserves processor and storage resources that would otherwise be used to provide dissimilar samples, and conserves organizational resources that would otherwise be used to parse or discard the dissimilar samples.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
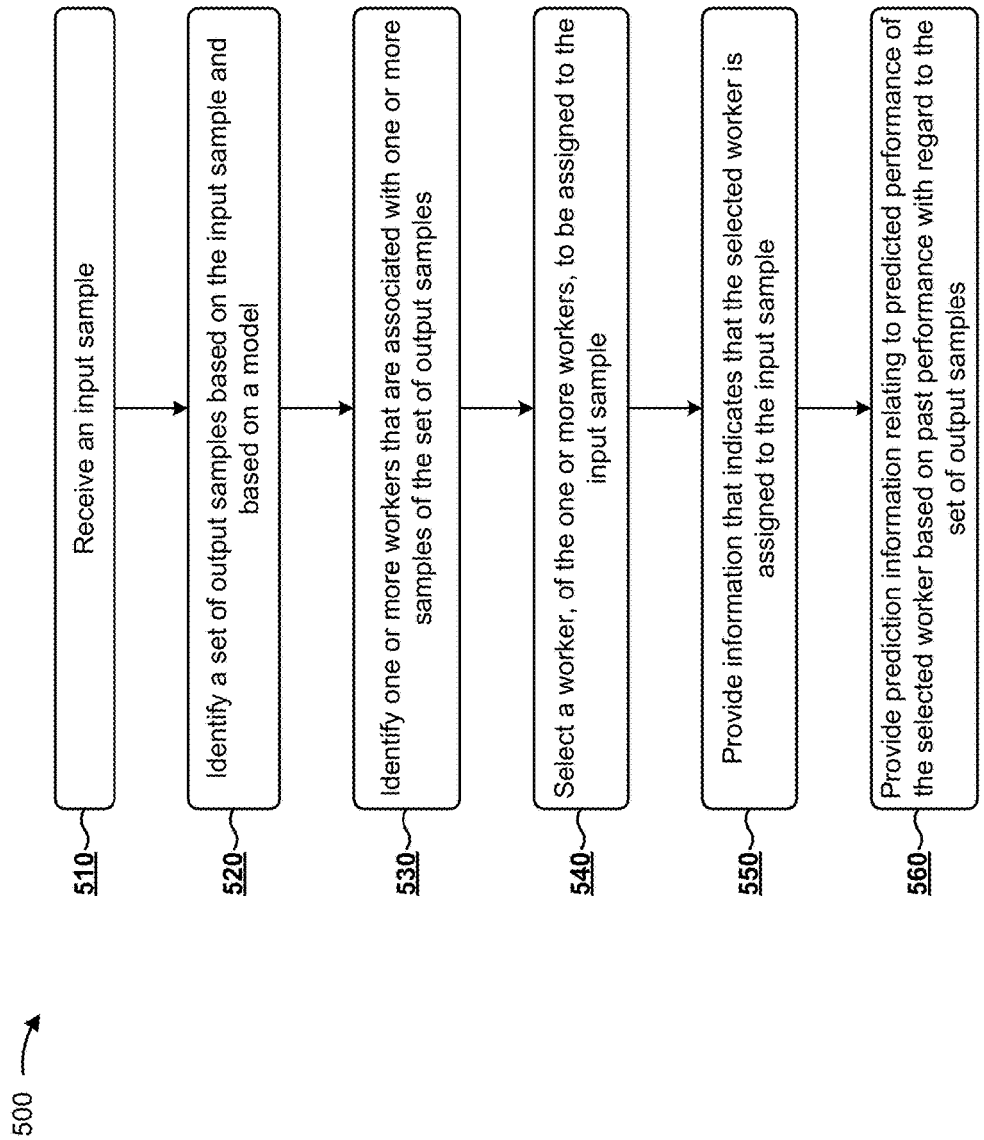
FIG. 5 is a flow chart of an example process for selecting a worker to be assigned to an input sample based on output samples that are similar to the input sample.

FIG. 5 is a flow chart of an example process 500 for selecting a worker to be assigned to an input sample based on output samples associated with the input sample. In some implementations, one or more process blocks of FIG. 5 may be performed by server device 220. In some implementations, one or more process blocks of FIG. 5 may be performed by another device or a group of devices separate from or including server device 220, such as client device 210.

As shown in FIG. 5, process 500 may include receiving an input sample (block 510). For example, server device 220 may receive an input sample, as described in more detail in connection with FIG. 4, above. As further shown in FIG. 5, process 500 may include identifying a set of output samples based on the input sample and based on a model (block 520). For example, server device 220 may identify a set of output samples, that are potentially relevant to the input sample, based on a model, as is also described in more detail in connection with FIG. 4, above.

As further shown in FIG. 5, process 500 may include identifying one or more workers that are associated with one or more samples of the set of output samples (block 530). For example, output samples, that have previously been processed by server device 220, may be associated with respective workers. A worker may perform a task or operation with regard to a sample. For example, a sample may include an incident report relating to application maintenance, and the worker may investigate and/or resolve the incident report. Server device 220 may assign workers to the samples, and may store information that identifies the workers associated with (e.g., assigned to) the samples. In some implementations, a worker may include a person (e.g., a technician, an IT professional, etc.). In some implementations, a worker may include a non-human entity. For example, a worker may include an application, a processor, or the like. As another example, when the incident includes detection of malware, the worker may include a particular application that has been used in the past to remove the malware.

Server device 220 may identify the one or more workers based on the one or more workers having processed at least one output sample of the set of output samples. For example, when a worker has performed a similar task or operation to one associated with the input sample, the worker may perform the task or operation associated with the input sample more efficiently than a worker that has not performed a similar task or operation. By identifying workers associated with similar tasks or operations (i.e., to similar output samples), server device 220 improves efficiency of allocation of the workers and conserves computational and/or organizational resources that would otherwise be used by less-experienced workers.

As further shown in FIG. 5, process 500 may include selecting a worker, of the one or more workers, to be assigned to the input sample (block 540). For example, server device 220 may select a worker from the one or more workers associated with the set of output samples. The selected worker may be selected to perform a task or operation associated with the input sample. For example, when the input sample includes an incident report or service ticket, the selected worker may be selected to evaluate or resolve an issue associated with the incident report or service ticket. In some implementations, server device 220 may select multiple selected workers. For example, an input sample may require two or more workers for processing. As another example, multiple workers may be suitable for assignment to a particular sample. In such a case, server device 220 may generate a ranked list that identifies the multiple workers based on scores associated with the multiple workers.

In some implementations, server device 220 may select a worker based on information relating to other samples to which the worker has been assigned. For example, server device 220 may select a worker based on a length of time since assignment to the other samples (e.g., may select a worker that was most recently assigned a similar sample, may select a worker with a shortest average length of time since being assigned to a set of similar samples, etc.). As another example, server device 220 may select a worker based on skills and/or expertise associated with the worker. For example, if a worker has been assigned to samples associated with a particular application or operation, server device 220 may select the worker based on the assignment to the samples associated with the particular application or operation.

In some implementations, server device 220 may determine scores for a set of workers. A score may indicate or identify a suitability of the worker for assignment to a particular sample. For example, a score may be determined based on one or more other samples to which a worker has previously been assigned, and based on similarity of the one or more other samples to the input sample for which the worker is to be selected. In some implementations, the score may be determined based on performance of a worker with regard to one or more other samples. For example, server device 220 may determine the score based on a cycle time associated with a worker (e.g., a length of time between assigning a worker to a sample and determining that the worker has processed the sample), a rating of performance of the worker with regard to previously assigned samples, a length of time since assignment of the worker to the previously assigned samples, or the like.

In some implementations, server device 220 may determine a score for a worker based on multiple, different factors. For example, server device 220 may determine a score for a worker based on a model. The model may receive, as input, an input sample, a set of output samples associated with the input sample, and worker information regarding workers that were assigned to the set of output samples. The model may output information that identifies scores corresponding to the one or more workers. In some implementations, the model may be trained based on, for example, a machine learning algorithm, an artificial intelligence process, or the like. For example, server device 220 may iteratively train and/or update the model based on information regarding performance of the one or more workers with regard to the input sample. In this way, server device 220 iteratively trains a model for assigning workers to perform tasks associated with samples, which improves allocation of worker resources and conserves computational and/or organizational resources that would otherwise be used to manually assign workers to samples.

In some implementations, server device 220 may assign a worker based on a regression model, such as a linear regression analysis, a least squares analysis, or the like. A regression analysis may fit a solution (e.g., an allocation of workers to a set of input samples) to target values of variables (e.g., rules or criteria for selection of workers based on worker information and/or samples associated with the workers). Based on the regression analysis, server device 220 may reduce (e.g., minimize) a measure of difference between solution values of the solution and the target values. For example, when performing a least squares regression analysis, server device 220 may reduce (e.g., minimize) a sum of squares of differences between the solution values (i.e., the allocation of workers) and the target values (i.e., the rules or criteria for selection of workers). Thus, server device 220 may determine an allocation of workers based on a best fit solution for a set of samples, thereby improving efficiency of allocation of the workers to the set of samples.

As further shown in FIG. 5, process 500 may include providing information that indicates that the selected worker is assigned to the input sample (block 550). For example, server device 220 may provide information identifying the selected worker that is assigned to the sample. In some implementations, server device 220 may provide information that identifies multiple, different workers. For example, server device 220 may provide information that identifies multiple different workers that are assigned to an input sample. As another example, server device 220 may provide a ranked list of workers from which to select a worker for an input sample. As yet another example, server device 220 may provide information that identifies an allocation of multiple, different workers to respective input samples.

In some implementations, server device 220 may provide the information to the selected worker or workers (e.g., to client devices 210 associated with the respective workers). In some implementations, server device 220 may provide the information to a device associated with an entity (e.g., a supervisor, a manager, or the like) that is associated with the selected worker. In some implementations, server device 220 may provide information regarding multiple, different workers to the device associated with the entity. In such a case, the entity may select a worker, of the multiple, different workers, to be associated with the input sample. Thus, server device 220 facilitates selection of workers to be assigned to samples (e.g., service tickets, incident reports, etc.).

In some implementations, server device 220 may provide information associated with the selected worker. For example, server device 220 may provide information indicating a score for the selected worker with regard to the input sample (e.g., based on suitability of the selected worker for performance of a task associated with the input sample), a name of the selected worker, a location of the selected worker, availability of the selected worker, a current work load associated with the selected worker, or the like. As another example, server device 220 may cause client device 210 associated with the selected worker to perform an action. For example, server device 220 may cause client device 210 to add an event to a calendar associated with the selected worker, may cause client device 210 to determine and/or provide directions to a location associated with the input sample, may cause client device to provide information regarding the input sample (e.g., output samples related to the input sample, diagnostic information associated with the input sample, etc.). In this way, server device 220 automatically causes client device 210 to perform an action based on assigning a worker associated with client device 210 to the input sample, which conserves computational resources that would otherwise be used to facilitate manual determination of information associated with the input sample.

As further shown in FIG. 5, process 500 may include providing prediction information relating to predicted performance of the worker based on past performance with regard to the set of output samples (block 560). For example, based on past performance of the selected worker and/or the one or more workers from which the worker was selected, server device 220 may determine prediction information. The prediction information may relate to predicted performance of the selected worker with regard to the input sample. For example, the prediction information may identify an expected performance value (e.g., a length of time to perform a task associated with the input sample, an expected quality of performance of the task, an expected number of times that a service ticket will be reopened, etc.) for the selected worker with regard to the input sample.

Server device 220 may provide the prediction information so that an entity associated with the selected worker (e.g., a manager, an administrator, etc.) can predict performance of the selected worker with regard to the input sample. In some implementations, server device 220 may provide prediction information for multiple, different workers. For example, server device 220 may determine prediction information for multiple workers to be potentially assigned to an input sample, and may provide the prediction information to the entity. The entity may select one or more workers, of the multiple workers, to be assigned to the input sample.

As another example, when server device 220 receives multiple, different input samples, server device 220 may determine prediction information for one or more workers with regard to each of the multiple, different input samples. Based on the prediction information, server device 220 and/or another entity may assign the one or more workers to the multiple, different input samples. For example, server device 220 or the other entity may determine a particular allotment of workers to the multiple, different input samples to reduce (e.g., minimize) a cycle time associated with resolution of service tickets identified by the multiple, different input samples. Thus, server device 220 facilitates assignment of workers to service tickets based on prediction information, which improves allotment of organizational resources.

In some implementations, server device 220 may determine the prediction information based on user feedback regarding a worker. For example, a management entity associated with a worker may submit ratings of performance of the worker with regard to samples associated with the worker. Server device 220 may determine the prediction information based on the ratings. For example, server device 220 may determine an average rating for a worker, may determine a rating for a worker with regard to similar samples corresponding to the input sample, or the like. In this way, server device 220 predicts worker performance based on user feedback regarding the worker, which permits more efficient allocation of worker resources in comparison to a situation where user feedback regarding the worker is not processed to determine the prediction information.

In some implementations, server device 220 may automatically determine the prediction information. For example, server device 220 may receive completion information indicating that a worker has completed one or more assigned tasks, and may determine the prediction information for the worker based on the completion information. In some implementations, server device 220 may automatically determine an average length of time between assignment to a sample and completion of a task associated with the sample, a maximum length of time between assignment to a sample and completion of a corresponding task, or the like. In this way, server device 220 automatically determines prediction information based on completion information, which reduces manual input in relation to the assignment of workers and, thereby, conserves computing resources.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
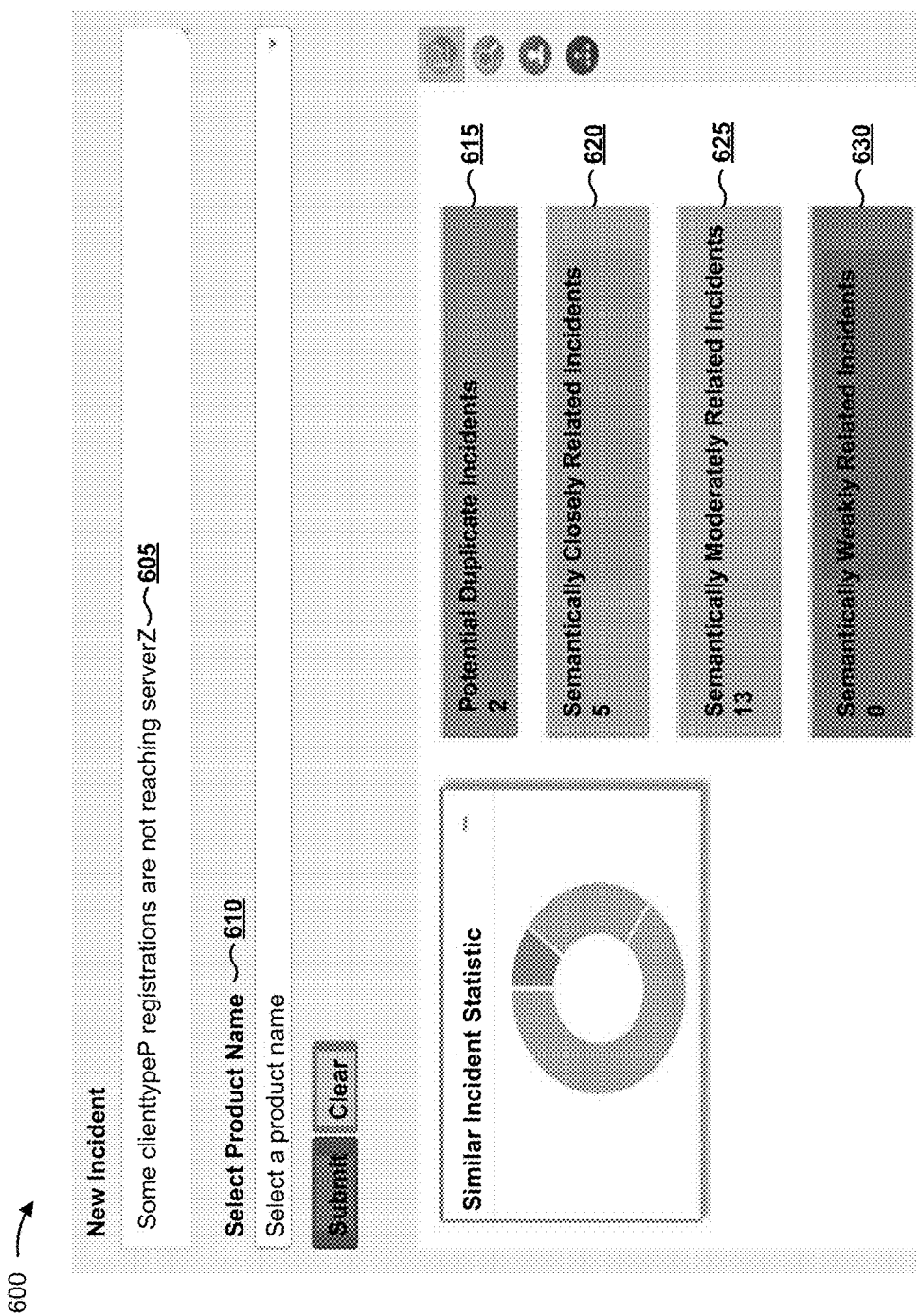
FIGS. 6A-6C are diagrams of example user interfaces relating to the example processes shown in FIGS. 4 and 5.
Figure 6B:
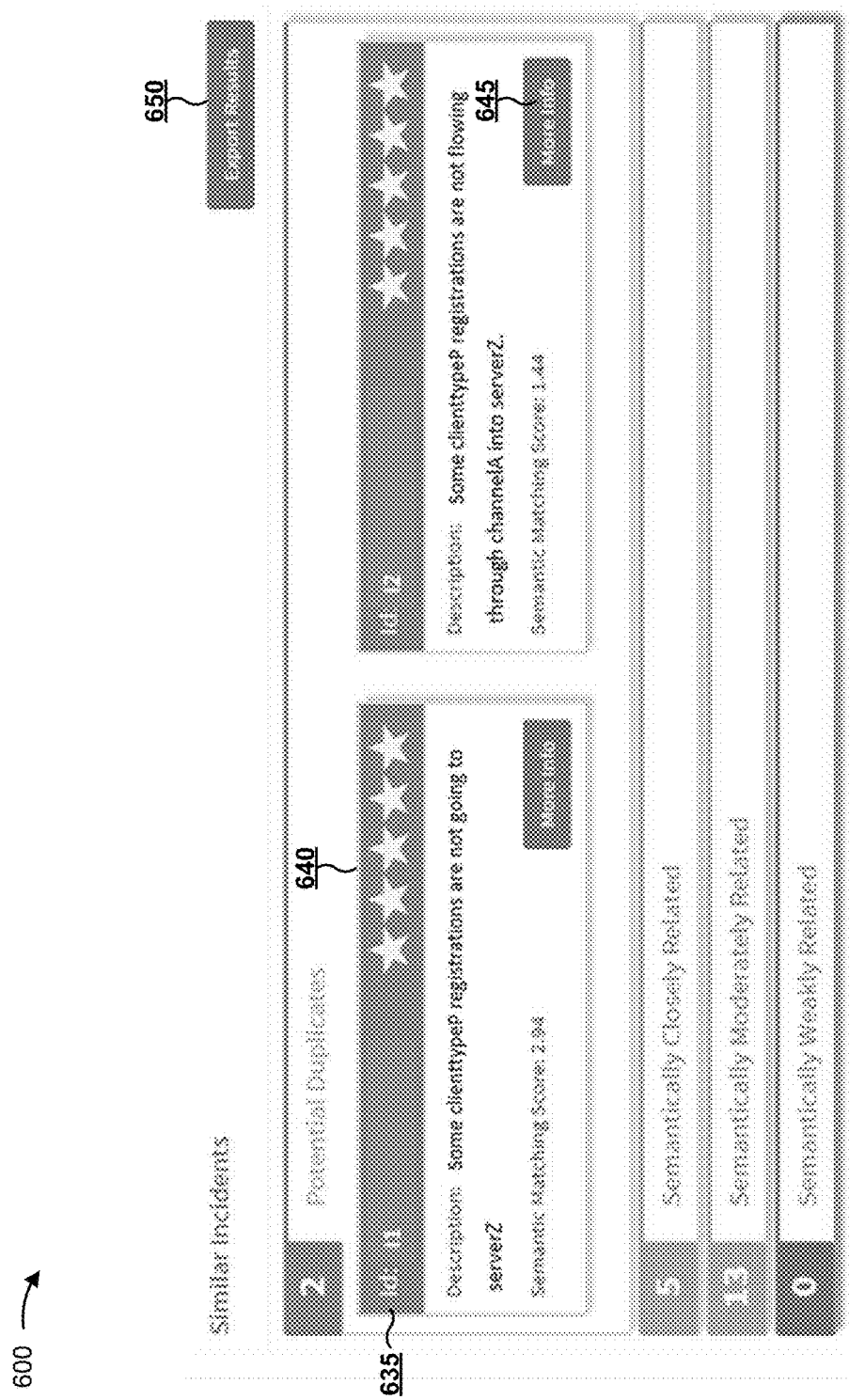
Figure 6C:
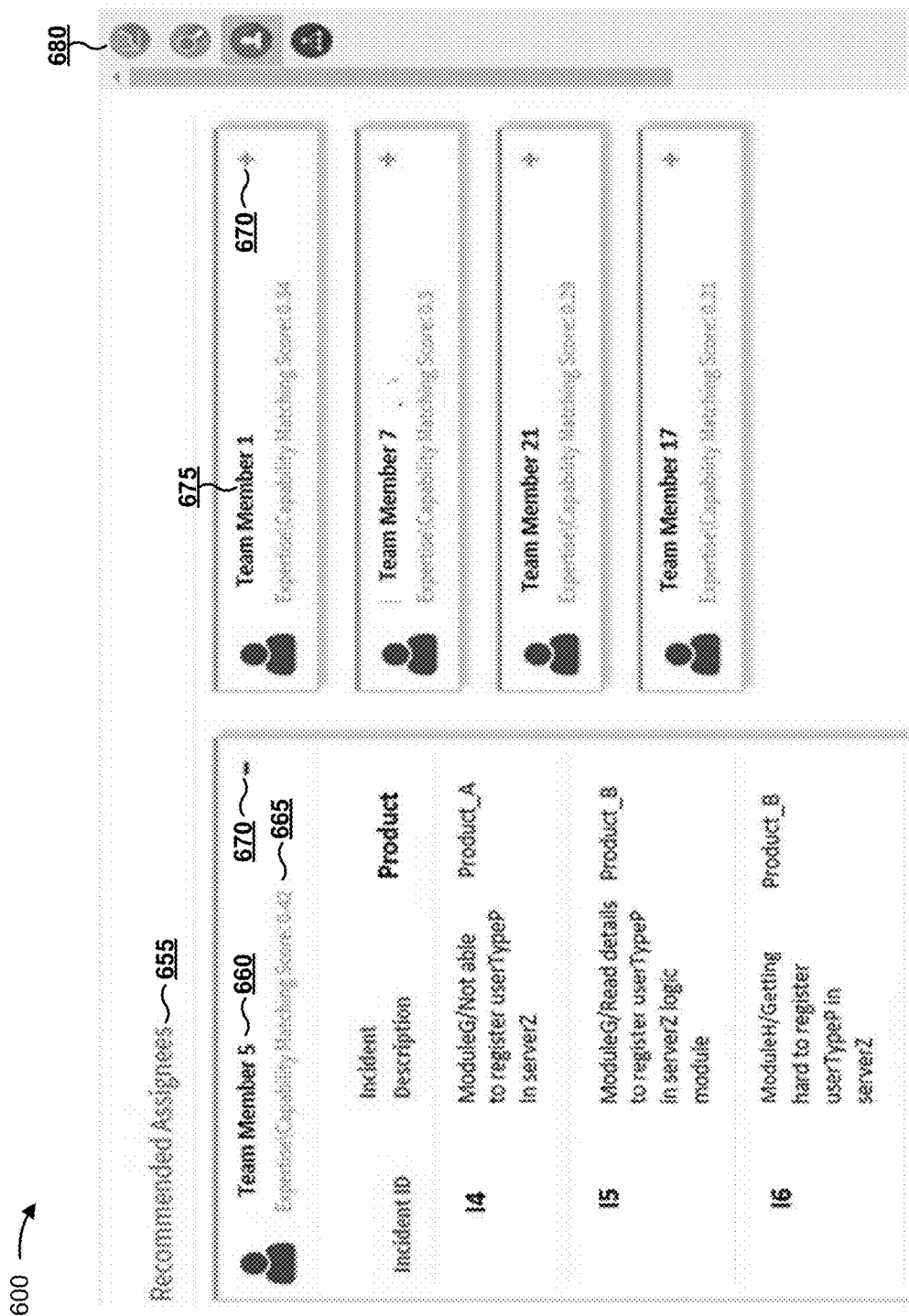

FIGS. 6A-6C are diagrams of example user interfaces 600 relating to example processes 400 and 500 shown in FIGS. 4 and 5. For the purpose of FIGS. 6A-6C, assume that samples correspond to incident reports that are submitted regarding one or more products. In some implementations, user interface 600 may be provided for display by client device 210. In some implementations, user interface 600 may be provided by another device (e.g., server device 220, for display by client device 210 or another device).

As shown in FIG. 6A, and by reference number 605, client device 210 may receive information that identifies an input sample (e.g., a new incident of "Some clienttypeP registrations are not reaching serverZ"). As shown by reference number 610, client device 210 may provide an interface element based on which to receive information that identifies a product name. Here, client device 210 does not receive information that identifies the product name associated with the input sample. Assume that client device 210 identifies output samples based on the input sample and based on acceptance information associated with the output samples (e.g., based on the output samples having been provided as similar samples for one or more comparison samples that are semantically similar to the input sample).

As shown by reference number 615, client device 210 may provide information that identifies one or more potential duplicate samples. A potential duplicate sample may include an output sample that is associated with a final similarity score that satisfies a duplication threshold (e.g., a similarity score determined based on one or more models and/or based on acceptance information associated with the output sample, as described in connection with FIG. 4, above). By identifying potential duplicate samples, client device 210 reduces a quantity of output samples that a user may need to parse, thereby conserving processor resources that would otherwise be used to provide information regarding a larger quantity of output samples.

As further shown, client device 210 may provide information regarding categories of output samples, including semantically closely related samples (e.g., five semantically closely related samples, as shown by reference number 620), one or more semantically moderately related samples (e.g., thirteen semantically moderately related samples, as shown by reference number 625), and, where appropriate, one or more semantically weakly related incidents (e.g., as shown by reference number 630). Each of the categories of samples may be associated with a different similarity score threshold. For example, potential duplicate samples may be associated with a first, highest similarity score threshold, semantically closely related samples may be associated with a second-highest similarity score threshold, semantically moderately related samples may be associated with a third-highest similarity score threshold, and semantically weakly related samples may be associated with a lowest similarity score threshold.

For the purpose of FIG. 6B, assume that client device 210 receives a user interaction with a portion of user interface 600 relating to the potential duplicate samples (e.g., the portion shown by reference number 615). As shown by reference number 635, based on receiving the user interaction, client device 210 may provide information regarding the potential duplicate samples. Here, client device 210 provides an identifier associated with each potential duplicate sample, a description of each potential duplicate sample, a product identifier associated with each potential duplicate sample, and a similarity score for each potential duplicate sample.

As shown by reference number 640, user interface 600 may include an element for receiving acceptance information. Here, the element includes five star buttons. For example, client device 210 may receive a user interaction to specify a level of similarity or relevance of the potential duplicate samples with regard to the input (e.g., a rating out of five stars). Client device 210 may determine acceptance information based on the user interaction, as described in more detail elsewhere herein. In this way, client device 210 facilitates input and determination of acceptance information for the output samples.

As shown by reference number 645, user interface 600 may include an element based on which to provide, for display, additional information regarding an output sample. For example, when client device 210 receives an interaction with element 645, client device 210 may provide, for display, information that identifies a time at which the output sample was received or resolved, a comparison sample corresponding to the output sample, a worker that was assigned to the output sample, and/or the like.

As shown by reference number 650, user interface 600 may include an element based on which to export information regarding the output samples. When client device 210 receives an interaction with element 650, client device 210 may provide information regarding one or more of the output samples (e.g., the information provided via user interface 600, the additional information regarding the output samples, etc.).

For the purpose of FIG. 6C, assume that client device 210 identifies a set of workers to potentially be assigned to resolve an incident associated with the input sample. As shown in FIG. 6C, and by reference number 655, client device 210 may provide information regarding the set of workers. As shown by reference number 660, client device 210 may identify a worker that is a best match, and may provide information that identifies the worker that is the best match. Here, client device 210 identifies Team Member 5. As shown by reference number 665, client device 210 may identify the worker Team Member 5 based on Team Member 5 being associated with a highest score of the set of workers (e.g., the expertise/capability matching score). For example, client device 210 may store or have access to information that identifies expertise of the workers, capabilities of the workers, or the like, and may determine the score based on this information. As further shown, client device 210 may provide, for display, the scores associated with the workers. As shown, in some cases, client device 210 may assign ranks to the workers based on the scores associated with the workers.

As shown by reference number 670, user interface 600 may include an element to cause client device 210 to provide additional information regarding the workers. Here, assume that client device 210 has received a user interaction with element 670 that is associated with the worker Team Member 5. As shown, based on receiving the user interaction, client device 210 provides information regarding other samples to which the worker Team Member 5 has been assigned (e.g., incident identifiers associated with the other samples, descriptions associated with the other samples, product identifiers associated with the other samples, etc.). By providing the additional information based on element 670, client device 210 conserves computational resources that would otherwise be used to provide all information regarding a worker.

As shown by reference number 675, client device 210 may provide information regarding other workers that may be assigned to the input sample. Based on receiving an interaction with portions of the user interface corresponding to the other workers, client device 210 may provide information regarding the other workers.

As shown by reference number 680, user interface 600 may include elements based on which to provide or modify data regarding the samples and/or the workers. For example, user interface 600 may include an element 680 to cause client device 210 to provide a graphical representation of data regarding the samples and/or workers. As another example, user interface 600 may include an element 680 to cause client device 210 to search for particular data (e.g., based on a user input). As yet another example, user interface 600 may include an element 680 to cause client device 210 to provide a representation of relationships between samples (e.g., comparison samples, input samples, and/or output samples). In this way, client device 210 may provide a customized interface based on interactions with elements 680, which improves efficiency of user interaction with user interface 600 and, thereby, conserves computational resources that would otherwise be used to facilitate interactions with an un-customized interface.

As indicated above, FIGS. 6A-6C are provided merely as an example. Other examples are possible and may differ from what was described with regard to FIGS. 6A-6C.

Implementations described herein identify output samples that are similar or relevant to an input sample based on semantic similarity of the input sample to a comparison sample. Based on user input that identifies whether the output samples are useful or relevant for the comparison sample, implementations described herein select which output samples have been most useful or relevant for the comparison samples and therefore the input sample. Furthermore, implementations described herein identify workers to potentially be assigned to the input sample based on the workers having been assigned to the output samples, which improves efficiency of allocation of worker resources and conserves processor resources that would otherwise be used to identify workers based on more labor-intensive methods.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive an input sample of textual content;
identify a comparison samples that is semantically similar to the input sample,
the comparison sample being identified based on a first similarity score, of the comparison sample and the input sample, satisfying a semantic similarity threshold;
determine second similarity scores corresponding to a plurality of potential samples,
the plurality of potential samples including textual content, and
the second similarity scores being determined based on acceptance information corresponding to the plurality of potential samples and based on semantic similarity of the plurality of potential samples to the comparison sample,
a particular sample, of the plurality of potential samples, includes a term that is not included in the comparison sample or the input sample, and
the term is associated with acceptance information that indicates that the term was specified as dissimilar to or irrelevant to the comparison sample;
modify a second similarity score, of the second similarity scores, associated with the particular sample, based on the acceptance information indicating that the term was specified as dissimilar to or irrelevant to the comparison sample;
identify, based on the second similarity scores, a plurality of output samples from the plurality of potential samples,
where the particular sample is excluded from the plurality of output samples based on the modification of the second similarity score; and
store or provide the plurality of output samples.

2. The device of claim 1, where the acceptance information is first acceptance information that is determined based on a first user input; and
where the one or more processors are further to:
receive second acceptance information regarding the input sample and the plurality of output samples,
the second acceptance information being determined based on a second user input regarding the input sample and the plurality of output samples; and
store the second acceptance information.

3. The device of claim 2, where the one or more processors, when identifying the plurality of output samples, are further to:
identify the plurality of output samples based on a model,
the model receiving, as input, the input sample and the first acceptance information, and
the model outputting information that identifies the plurality of output samples; and
where the one or more processors are further to:
train or update the model based on the second acceptance information.

4. The device of claim 2, where the input sample is a first input sample; and
where the one or more processors are further to:
receive a second input sample;
determine that the second input sample satisfies the semantic similarity threshold with regard to the first input sample; and
identify one or more particular output samples, of the plurality of output samples, to be associated with the second input sample,
the one or more particular output samples being identified based on the second acceptance information.

5. The device of claim 1, where the one or more processors are further to:
identify one or more workers to be assigned to the input sample, at least one of the one or more workers having been assigned to at least one of the plurality of output samples; and
provide information that identifies the one or more workers.

6. The device of claim 5, where the one or more processors are further to:
determine prediction information that identifies predicted performance of the one or more workers with regard to a task associated with the input sample,
the prediction information being determined based on past performance of the one or more workers with regard to at least one task associated with the plurality of output samples.

7. A method, comprising:
receiving, by a device, an input sample of textual content;
identifying, by the device, a comparison sample that is semantically similar to the input sample,
the comparison sample being identified based on a first similarity score, of the comparison sample and the input sample, satisfying a semantic similarity threshold;
determining, by the device, second similarity scores corresponding to a plurality of potential samples,
the plurality of potential samples including textual content, and
the second similarity scores being determined based on acceptance information corresponding to the plurality of potential samples and based on semantic similarity of the plurality of potential samples to the comparison sample,
a particular sample, of the plurality of potential samples, includes a term that is not included in the comparison sample or the input sample, and the term is associated with acceptance information that indicates that the term was specified as dissimilar to or irrelevant to the comparison sample;
modifying, by the device, a second similarity score, of the second similarity scores, associated with the particular sample, based on the acceptance information indicating that the term was specified as dissimilar to or irrelevant to the comparison sample;
identifying, by the device and based on the second similarity scores, a plurality of output samples from the plurality of potential samples,
where the plurality of output samples includes the particular sample;
and
storing or providing, by the device, the plurality of output samples.

8. The method of claim 7, where the acceptance information is first acceptance information; and
where providing the plurality of output samples comprises:
providing information regarding the plurality of output samples via an interface; and
receiving, via the interface, second acceptance information regarding similarity or relevance of the plurality of output samples to the input sample.

9. The method of claim 8, where the plurality of output samples are identified based on a model,
the model receiving, as input, the input sample and the first acceptance information; and
the model outputting information that identifies the plurality of output samples; and
where the method further comprises:
training or updating the model based on the second acceptance information.

10. The method of claim 7, where identifying the plurality of output samples comprises:
identifying a second output sample, of the plurality of output samples, based on a set of terms that are included in each of the plurality of output samples, the input sample, and the comparison sample,
the acceptance information indicating that the second output sample was similar or relevant to the comparison sample.

11. The method of claim 7, where a second sample, of the plurality of potential samples, is associated with acceptance information that indicates that the second sample includes a second term that was specified as similar to or relevant to the comparison sample,
the second term being included in at least one of the comparison sample or the input sample; and
the method further comprises:
modifying another second similarity score, of the second similarity scores, associated with the second sample, based on the acceptance information indicating that the second term was specified as similar to or relevant to the comparison sample.

12. The method of claim 7, where the acceptance information indicates that a particular output sample, of the plurality of output samples, was accepted as relevant or similar to the comparison sample; and
where identifying the plurality of output samples comprises:
automatically selecting the particular output sample as one of the plurality of output samples based on the similarity score of the input sample and the comparison sample satisfying the semantic similarity threshold.

13. The method of claim 7,
where the acceptance information indicates that a particular potential sample, of the plurality of potential samples, was rejected as irrelevant or dissimilar to the comparison sample; and
where identifying the plurality of output samples comprises:
automatically rejecting the particular potential sample based on the similarity score of the input sample and the comparison sample satisfying the semantic similarity threshold.

14. The method of claim 7, further comprising:
identifying one or more workers to be assigned to the input sample,
the one or more workers having previously been assigned to at least one output sample of the plurality of output samples.

15. A computer-readable medium storing instructions, the instructions comprising:
one or more instructions that, when executed by one or more processors, cause the one or more processors to:
receive an input sample of textual content;
identify comparison samples that are semantically similar to the input sample,
the comparison samples being identified based on one or more first similarity scores, of the comparison samples and the input sample, satisfying a semantic similarity threshold;
determine second similarity scores corresponding to a plurality of potential samples,
the plurality of potential samples including textual content, and
the second similarity scores being determined based on acceptance information corresponding to the plurality of potential samples and based on semantic similarity of the plurality of potential samples to the comparison samples, a particular sample, of the plurality of potential samples, includes a term that is included in the comparison sample or the input sample, and the term is associated with acceptance information that indicates that the term was specified as similar to or relevant to the comparison sample;

modify a second similarity score, of the second similarity scores, associated with the particular sample, based on the acceptance information indicating that the term was specified as similar to or relevant to the comparison sample;

identify, based on the second similarity scores, a plurality of output samples from the plurality of potential samples,
where the plurality of output samples includes the particular sample;
and store or provide the plurality of output samples.

16. The computer-readable medium of claim 15, where the one or more instructions, when executed by the one or more processors, further cause the one or more processors to:

receive the acceptance information based on providing the plurality of output samples in connection with the comparison samples,
the plurality of output samples being provided in connection with the comparison samples before the input sample is received.

17. The computer-readable medium of claim 15, where the one or more instructions, when executed by the one or more processors, cause the one or more processors to:

identify one or more workers to be assigned to the input sample,
the one or more workers having previously been assigned to at least one output sample of the plurality of output samples.

18. The computer-readable medium of claim 17, where the one or more instructions, that cause the one or more processors to identify the one or more workers, cause the one or more processors to:

identify predicted performance of the one or more workers with regard to a task associated with the input sample,
the predicted performance being identified based on past performance, of the one or more workers, with regard to at least one task associated with the at least one output sample.

19. The computer-readable medium of claim 15, where the acceptance information is first acceptance information; and where the one or more instructions, that cause the one or more processors to identify the plurality of output samples, cause the one or more processors to:

identify the plurality of output samples based on a model,
the model receiving, as input, the input sample and the comparison samples, and
the model outputting, based on the first acceptance information, information that identifies the plurality of output samples; and where the one or more instructions, when executed by the one or more processors, cause the one or more processors to:

receive second acceptance information regarding similarity or relevance of the plurality of output samples with regard to the input sample; and update the model based on the second acceptance information.

20. The computer-readable medium of claim 15, where the one or more instructions, when executed by the one or more processors, cause the one or more processors to:

determine a particular similarity score, of the second similarity scores, for a particular output sample, of the plurality of output samples, based on one of:

the particular output sample being previously provided as an output sample with regard to a particular comparison sample that is identical or substantially identical to the input sample, and, when the particular output sample is associated with acceptance information indicating that the particular output sample was accepted as similar or relevant to the particular comparison sample, automatically assigning a maximum similarity score as the particular similarity score for the particular comparison sample, or the particular output sample being previously provided as an output sample with regard to a particular comparison sample that is identical or substantially identical to the input sample, and, when the particular output sample is associated with acceptance information indicating that the particular output sample was rejected as dissimilar or irrelevant to the particular comparison sample, automatically assigning a minimum similarity score as the particular similarity score for the particular comparison sample, or the particular output sample being previously provided as an output sample with regard to multiple, different comparison samples that are semantically related to the input sample, and, when the particular output sample is associated with acceptance information corresponding to the multiple, different comparison samples, based on the acceptance information corresponding to the multiple, different samples.

* * * * *